US008932123B2

(12) United States Patent
Murayama et al.

(10) Patent No.: US 8,932,123 B2
(45) Date of Patent: Jan. 13, 2015

(54) ASSEMBLY BLOCK AND DISPLAY SYSTEM

(75) Inventors: Fumitaka Murayama, Nagano (JP); Fumiyoshi Ito, Nagano (IT); Takeshi Matsushima, Nagano (JP); Hideyuki Uchida, Nagano (JP)

(73) Assignee: Stellararts Corporation, Okaya-Shi, Nagano (JP)

( * ) Notice: Subject to any disclaimer, the term of this patent is extended or adjusted under 35 U.S.C. 154(b) by 1445 days.

(21) Appl. No.: 12/602,051

(22) PCT Filed: May 28, 2008

(86) PCT No.: PCT/JP2008/059843

§ 371 (c)(1),
(2), (4) Date: May 26, 2010

(87) PCT Pub. No.: WO2008/146860

PCT Pub. Date: Dec. 4, 2008

(65) Prior Publication Data

US 2011/0074833 A1 Mar. 31, 2011

(30) Foreign Application Priority Data

May 28, 2007 (JP) ................................ 2007-140089
May 28, 2007 (JP) ................................ 2007-140092

(51) Int. Cl.

*A63F 9/24* (2006.01)
*A63F 13/00* (2014.01)
*G06F 17/00* (2006.01)
*G06F 19/00* (2011.01)
*A63H 33/04* (2006.01)
*G09F 9/33* (2006.01)
*G09F 27/00* (2006.01)
*H05B 33/08* (2006.01)

(52) U.S. Cl.

CPC ............ *A63H 33/042* (2013.01); *A63H 33/083* (2013.01); *G09F 9/33* (2013.01); *G09F 27/00* (2013.01); *H05B 33/0857* (2013.01)
USPC .................... 463/15; 463/36; 463/37; 463/38

(58) Field of Classification Search

CPC ............ A63F 2003/00697; A63F 2003/00716; A63F 2003/00719; A63F 2003/00725; A63F 2003/00735; A63F 2003/00738
USPC ........................................................... 463/15
See application file for complete search history.

(56) References Cited

U.S. PATENT DOCUMENTS 6,939,192 B1 9/2005 Munch et al.
2005/0026537 A1 2/2005 Hsieh et al.

FOREIGN PATENT DOCUMENTS

DE 198 53 424 A1 6/2000
EP 1 047 021 A2 10/2000

(Continued)

OTHER PUBLICATIONS

International Search Report (PCT/ISA/210) for PCT/JP2008/059843 mailed Sep. 2, 2008.

(Continued)

*Primary Examiner* — Kevin Y Kim
(74) *Attorney, Agent, or Firm* — Buchanan Ingersoll & Rooney PC

(57) ABSTRACT

An assembly block (20) including an LED element (51), a control unit (52) that controls the LED element (51), and a housing (30) that holds the LED element (51) and the control unit (52) is provided. The housing (30) includes mechanical interfaces (32, 33) for mechanically connecting to the outside and is at least partially translucent. The control unit (52) includes a first functional unit (111) that stores, on receiving first data sets (D1) that include data for controlling the color of light to be outputted from the LED element (51) and a transfer command via the first electrical interface (79*a*) associated with the first mechanical interface (32), the first data set (D1) in a buffer (121) and outputs the stored first data set (DS1) in the buffer (121) together with the transfer command via a second electrical interface (79*b*) associated with the mechanical interface (33) on the second side.

34 Claims, 27 Drawing Sheets

(56) References Cited

FOREIGN PATENT DOCUMENTS

| | | | |
|---|---|---|---|
| JP | 61-195075 | U | 12/1986 |
| JP | 61-195076 | U | 12/1986 |
| JP | 04-123701 | A | 4/1992 |
| JP | 10-108985 | A | 4/1998 |
| JP | 2003-150119 | A | 5/2003 |
| JP | 2003-168305 | A | 6/2003 |
| JP | 2005-032649 | A | 2/2005 |
| WO | WO 02/098182 | A2 | 12/2002 |
| WO | WO 2004/018063 | A1 | 3/2004 |

OTHER PUBLICATIONS

Written Opinion (PCT/ISA/237) for PCT/JP2008/059843 mailed Sep. 2, 2008.

Supplementary European Search Report dated Mar. 4, 2012, issued in the corresponding European Patent Application No. 08776958.4. (7 pages).

Fig. 12

| Orientation detection bits | | Connection angle (degrees) |
|---|---|---|
| Bit 1 | Bit 0 | |
| 0 | 0 | 0 |
| 0 | 1 | 90 |
| 1 | 0 | 180 |
| 1 | 1 | 270 |

Fig. 13

| DIP switch setting \ bit | S3 | S2 | S1 | S0 |
|---|---|---|---|---|
| Input side of standard block | 0 | 0 | 0 | 0 |
| Input side of block for diagonal-rising | 0 | 0 | 0 | 1 |
| Single block | 0 | 0 | 1 | 0 |
| ⋮ | ⋮ | ⋮ | ⋮ | ⋮ |
| Output side | 1 | 1 | 1 | 1 |

Fig. 15

| Command name | Command code | Data 1 | Data 2 | Data 3 | |
|---|---|---|---|---|---|
| LED OFF | 80H | – | – | – | |
| LED ON | 81H | – | – | – | |
| Data transfer | 83H | R data | G data | B data | D1 |
| Latch | 84H | – | – | – | |
| ⋮ | ⋮ | ⋮ | ⋮ | ⋮ | |
| Connection enquiry | FEH | 0 | – | – | D3 |
| Initialize | FFH | – | – | – | |
| | | | | | |

Fig. 16

D2

| bit | 7 | 6 | 5 | 4 | 3 | 2 | 1 | 0 |
|---|---|---|---|---|---|---|---|---|
| Meaning | Fixed | Shape identification bits | | | | Reserved | Orientation detecting bits | |
| Value | 0 | S3 | S2 | S1 | S0 | 0 | D1 | D2 |

Fig. 19

| Sender | Receiver | T1 | T2 | T3 | T4 | T5 | T6 | T7 | T8 | T9 | T10 | T11 | T12 | T13 | T14 | T15 |
|---|---|---|---|---|---|---|---|---|---|---|---|---|---|---|---|---|
| Computer terminal | M1 | FF | 80 | 81 | | | | | | | | | | | | |
| M1 | M2 | | FF | 80 | 81 | | | | | | | | | | | |
| M2 | M3 | | | FF | 80 | 81 | | | | | | | | | | |
| M3 | M4 | | | | FF | 80 | 81 | | | | | | | | | |
| M4 | M5 | | | | | FF | 80 | 81 | | | | | | | | |
| M5 | M6 | | | | | | FF | 80 | 81 | | | | | | | |
| M6 | M7 | | | | | | | FF | 80 | 81 | | | | | | |
| M7 | M8 | | | | | | | | FF | 80 | 81 | | | | | |
| M8 | M9 | | | | | | | | | FF | 80 | 81 | | | | |
| M9 | M10 | | | | | | | | | | FF | 80 | 81 | | | |
| M10 | M11 | | | | | | | | | | | FF | 80 | 81 | | |
| M11 | M12 | | | | | | | | | | | | FF | 80 | 81 | |
| M12 | Computer terminal | | | | | | | | | | | | | FF | 80 | 81 |

Fig. 20

| Sender | Receiver | T1 | T2 | T3 | T4 | T12 | T13 | T14 | T15 | T16 | T17 | T18 | T19 | T20 | T21 | T22 | T23 | T24 | T25 | T26 |
|---|---|---|---|---|---|---|---|---|---|---|---|---|---|---|---|---|---|---|---|---|
| Computer terminal | M1 | FE | 00 | | | | | | | | | | | | | | | | | |
| M1 | M2 | | FE | 01 | 10 | | | | | | | | | | | | | | | |
| M2 | M3 | | | FE | 02 | | | | | | | | | | | | | | | |
| M3 | M4 | | | | FE | | | | | | | | | | | | | | | |
| M4 | M5 | | | | | | | | | | | | | | | | | | | |
| M5 | M6 | | | | | 78 | | | | | | | | | | | | | | |
| M6 | M7 | | | | | 00 | 78 | 00 | | | | | | | | | | | | |
| M7 | M8 | | | | | 78 | 00 | 78 | 00 | 78 | | | | | | | | | | |
| M8 | M9 | | | | | 00 | 78 | 00 | 78 | 00 | 78 | 00 | | | | | | | | |
| M9 | M10 | | | | | 10 | 00 | 78 | 00 | 78 | 00 | 78 | 00 | 78 | | | | | | |
| M10 | M11 | | | | | 10 | 10 | 00 | 78 | 00 | 78 | 00 | 78 | 00 | 78 | 00 | | | | |
| M11 | M12 | | | | | FE | 11 | 10 | 00 | 78 | 00 | 78 | 00 | 78 | 00 | 78 | 00 | 78 | | |
| M12 | Computer terminal | | | | | | FE | 12 | 10 | 00 | 78 | 00 | 78 | 00 | 78 | 00 | 78 | 00 | 78 | 00 |

D3 PM1 PM2 PM3 PM4 PM5 PM6 PM7 PM8 PM9 PM10 PM11 PM12

| Y \ X | 5 | 4 | 3 | 2 | 1 | 0 |
|---|---|---|---|---|---|---|
| 1 | M11 | M10 | M7 | M6 | M3 | M2 |
| 0 | M12 | M9 | M8 | M5 | M4 | M1 |

2

ASSEMBLY BLOCK AND DISPLAY SYSTEM

TECHNICAL FIELD

The present invention relates to an assembly block in which an LED or other light-emitting element is incorporated, and to a display system that uses such assembly blocks.

BACKGROUND ART

Japanese Laid-Open Patent Publication No. 2005-32649 discloses a light-emitting apparatus that emits decorative light by causing light sources, a plurality of which are disposed on a wall surface or the like, to flash with predetermined light-emission timing, the light-emitting apparatus including a light emitter where a light-emitting element is enclosed inside a lamp case, an attachment base that enables a plurality of light emitters to be attached onto one surface of a plate-like member and enables the other surface to be fixed to the wall surface or the like, and a controller that stores flashing information relating to the light emitters in a storage apparatus and transmits flashing control signals to the light emitters based on the flashing information, wherein the light-emitting apparatus is characterized by a plurality of engagement portions that fix and hold the light emitters being provided at fixed intervals on the attachment base and the light emitters being detachably attached to the engagement portions at suitable intervals.

Japanese Laid-Open Patent Publication No. H10-108985 discloses an assembly block that realizes at least one function out of a plurality of functions required to construct an assembled toy, the assembly block including a function expressing means for expressing the function of the assembly block, a control means that controls the function expressing means, and a communication means that carries out communication with other assembly blocks.

Japanese Laid-Open Patent Publication No. 2005-510007 (International Publication WO2002/098182) discloses a lighting system including: an LED lighting system adapted to receive a data stream via a first data port, to issue at least one lighting condition based on at least a first part of the data stream, and transfer at least a second part of the data stream via a second data port; and a housing that holds the LED lighting system and is adapted to electrically associating the first and second data ports with a data connection unit equipped with an electric conductor that has at least one non-continuous section including a first side and a second side that is electrically insulated from the first side. A lighting system is disclosed where the housing is adapted to the first data port being electrically associated with the first side of the non-continuous section and the second data port being electrically associated with the second side of the non-continuous section.

There is demand for a system that can emit light in a shape that is freely chosen in accordance with the shape of an exhibition space, a wall surface, or the like. There is also demand for the ability to favorably control the individual light-emitting units that construct this type of system. As disclosed in the Publication 2005-510007, one solution is to use a controller that is combined with at least one LED light source and at least one other controllable device and has an address that can be independently designated. The Publication No. H10-108985 discloses that the respective assembly blocks communicate using network variables defined on a network. The Publication No. 2005-32649 discloses that individual light emitters are positioned by fixing and holding a plurality of light emitters with fixed intervals on the attachment base.

To distinguish between individual light emitters by specifying addresses and/or using network variables, it is necessary to set addresses and/or set network variables for the individual light emitters in advance. Here, unless a light emitter that has been set a predetermined address or network variable is installed at a predetermined position, the desired effect will not be achieved. With a method that attaches a plurality of light emitters onto an attachment base with a predetermined arrangement, it is only possible to dispose light emitters within the range provided on the attachment base.

DISCLOSURE OF THE INVENTION

It is one of objects of the present invention to provide a system that is capable of emitting light and has a flexibly chosen shape that matches the shape of a space or wall surface. For example, it is one of the objects to provide a system where it is simple to dismantle a display unit assembled in a given space and reassemble the display unit in a different space. It is another one of the objects to provide a system where electrical connections do not become a serious problem of reassembling and where it is easy to individually control light-emitting elements even after reassembly.

One aspect of the present invention is an assembly block comprising: a light-emitting element; a control unit including a function that controls light outputted from the light-emitting element; and a housing that holds at least the light-emitting element and the control unit. The housing includes mechanical interfaces that are provided on a first side and a second side respectively for mechanically connecting to the external (periphery), wherein at least part of the housing is translucent (optically transmitting). The control unit includes a first functional unit (first function) that stores, when a first data set that includes data for controlling color of light outputted from the light-emitting element and a first command that includes a designation of transfer of the first data set are received via a first electrical interface associated with the mechanical interface on the first side of the housing, the first data set received (the received first data set) in a buffer and outputs a stored first data set that was stored in the buffer via a second electrical interface associated with the mechanical interface on the second side together with the first command. The control unit includes a second functional unit (second function) that sets, when a second command that includes a designation of latching is received via the first electrical interface, the stored first data set as a next data set for controlling the light-emitting element and outputs the second command via the second electrical interface.

In the assembly block, the first functional unit does not transfer the first data set received via the first electrical interface as it is as a data stream to the second electrical interface. Instead, the first functional unit sends the stored first data set that has been stored in the data buffer. That is, the control unit of the assembly block first stores the first data set that is being transferred into the buffer (data buffer) managed by the control unit itself. In addition, the control unit first outputs the received first command via the second electrical interface and then outputs the stored first data set. Accordingly, in the assembly block, the first command received via the first electrical interface is outputted next from the second electrical interface so as to overtake the data sets being serially transferred or without being obstructed by the data sets being serially transferred.

This means that when data sets and commands have been transferred in a system including a plurality of assembly blocks that are electrically connected on a shared or common serial transfer circuit, instead of a simple FIFO, it is possible to transfer the command next from the second electrical interface so as to overtake the first data set being transferred or without its transferring being hindered by the first data set that is being transferred. Accordingly, when a second command that designates latching has been supplied (transferred) via the same electrical interface as the first data sets, the second functional unit can transfer the second command before the first data sets. This means that in a system where a plurality of assembly blocks and/or a plurality of control units are serially connected, by supplying the second command that designates latching at appropriate timing, it is possible to set a desired first data set in each control unit as the next data set.

Accordingly, it is possible to cause the control unit of a desired assembly block to receive and latch a desired first data set even if the individual assembly blocks or control units are not assigned identification information, such as network addresses, for specifying the individual blocks or units. For example, it is possible to assemble a display unit using a plurality of assembly blocks and to transfer data for displaying a desired image to the individual assembly blocks without assigning addresses to the individual assembly blocks. It is preferable that the control unit further includes a third functional unit (third function) that controls, when a third command that includes designation of switching of illumination control of the light-emitting element is received via the first electrical interface, the light-emitting element so as to produce an illumination state based on the next data set. The third functional unit also includes outputting the third command via the second electrical interface. It is possible to transmit the third command for illuminating using the same electrical interface that transfers the first data sets and it is possible to cause the individual assembly blocks to illuminate or emit light with desired conditions (color, luminance, and the like).

It is preferable that the control unit further includes a forth functional unit (fourth function) that outputs, when a fourth command that includes a designation of transfer of a second data set including information showing a connection relationship of the mechanical interface on the first side and/or the second side has been received via the first electrical interface, via the second electrical interface, the fourth command and at least one second data set received via the first electrical interface following the fourth command. The fourth functional unit further includes outputting, via the second electrical interface, the second data set of the present assembly block (assembly block itself) following the received at least one second data set.

When a plurality of assembly blocks have been connected by a serial transfer circuit, or when a serial transfer circuit has been formed by a plurality of assembly blocks, it is possible to transmit second data sets showing the mechanical connection relationships using the serial transfer circuit. When a display unit has been formed using a plurality of assembly blocks, it is possible to analyze the connection relationships between the plurality of assembly blocks by collecting the second data sets. Based on information (connection replication data) produced by analyzing the connection relationships, reordered first data sets can be sent with the first command and also the second command, it is possible to set data sets and commands for displaying images on desired assembly blocks of the display unit without assigning addresses in advance to the individual assembly blocks.

Accordingly, the assembly blocks are suited to forming a display unit capable of emitting light in a flexibly chosen shape that matches the shape of a space or wall surface. These assembly blocks are suited to a system where it is simple to dismantle a display unit that has been assembled in a given space and reassemble the display unit in a different space. In addition, the assembly blocks can prevent the problem of difficulty in electrical reconnections when the display unit is reassembled. Since it is not necessary to set network addresses to the assembly blocks in advance, we can flexibly electrically reconnects the assembly blocks when reassembles the display unit.

The assembly block preferably includes a signal wire (return wire) for outputting (returning, feeding back) data received via the second electrical interface directly via the first electrical interface. It is possible to supply data sets and commands to a serial transfer circuit including a plurality of assembly blocks or a serial transfer circuit produced by a plurality of assembly blocks from one end of such transfer circuit and to recover data sets from such end of the transfer circuit using the return wire.

The first-side and second-side mechanical interfaces preferably are mechanical connection units. The mechanical connections are respectively capable of connecting to mechanical connection units of housings of other assembly blocks, and the connection orientations of the housings of the other assembly blocks and the housing of the present assembly block are changeable. A display unit is assembled from a plurality of assembly blocks only. In addition, the mechanical connection units should preferably be connection units for connecting in an orientation freely chosen out of at least two orientations. It is possible to change the three-dimensional shape of the display unit assembled from the plurality of assembly blocks.

Each assembly block preferably further includes electrical connection units that become electrically connected to electrical connection units of other assembly blocks when the mechanical connection units are connected to the mechanical connection units of other assembly blocks. When the mechanical connection units are connected together, the first electrical interface and/or the second electrical interface become electrically connected to at least one of the control units (the electrical interfaces of such control units) included in the other assembly blocks via the electrical connection units. It is also possible to electrically connect a plurality of assembly blocks by merely assembling a display unit from the plurality of assembly blocks.

Typical layouts of the mechanical connection units and the electrical connection units are as follows. The mechanical connection units are provided on the respective housings so as to mechanically connect (the housings) with part of the housing of the other assembly block and part of the housing of the present assembly block in an overlapping state. The electrical connection units are provided on respective housings so as to connect to electrical connection units of other assembly blocks connected so as to overlap the present assembly blocks. By doing so, it is possible to mechanically connect the overlapping assembly blocks and to also electrically connect (for signals) the control units included in such assembly blocks, which makes it possible for the control units to communicate.

A typical shape for the housing is one of predetermined three-dimensional shapes (3D shapes) that are capable of being aligned or stacked with other housings. The housing includes an external form composed of one of the 3D shape units or a plurality of the 3D shape units joined together. When the housing has an external form composed of a plurality of the 3D shape units joined together, the mechanical interface on the first side and the mechanical interface on the second side can be provided on different unit of the 3D shape units in addition to or alternatively to being provided on the upper surface or lower surface of the housing. Other assembly blocks may be connected in not only the up-down direction of the housing but also in a horizontal direction (the left-right direction, the front-rear direction).

The assembly block may include a plurality of light-emitting elements. In particular, when the housing includes a first 3D shape unit (a part of the first 3D shape unit) and a second 3D shape unit (a part of the second 3D shape unit), the assembly block should preferably include a light-emitting system including a first light-emitting element disposed in the first 3D shape unit, a second light-emitting element disposed in the second 3D shape unit, a first control unit for the first light-emitting element, and a second control unit for the second light-emitting element. It becomes possible to display more than one dot, and typically two dots using one assembly block. In this case, the first and second control units should preferably be connected inside the light-emitting system that includes a printed circuit board. On such board, the first electrical interface of the second control unit is associated with the mechanical interface on the first side via the first control unit and the second electrical interface of the first control unit is associated with the mechanical interface on the second side via the second control unit.

The light-emitting system preferably includes a signal wire (return wire) for outputting (returning, feeding back) a signal received via the second electrical interface of the second control unit via the first electrical interface of the first control unit. This return wire may directly connect the electrical connection unit corresponding to the second electrical interface of the second control unit to the electrical connection unit corresponding to the first electrical interface of the first control unit.

The housing should preferably include at least one internal wall portion disposed between the first 3D shape unit and the second 3D shape unit. This internal wall portion makes it possible to optically separate the 3D shape units and prevent mixing lights or colors (crosstalk). When the housing includes three or more 3D shape units, internal wall portions (partition walls) may be provided at positions where the respective 3D shapes are optically separated.

Each electrical connection unit preferably includes: a first terminal group disposed so that an electrical connection relationship does not change according to a connection orientation of the mechanical connection units, that is, the connection orientation of the housings; and a second terminal group disposed so that an electrical connection relationship changes according to the connection orientation of the mechanical connection units, and the control unit should preferably include a functional unit that generates a second data set including information showing the connection orientation based on the electrical connection relationship of the second terminal group. The data sets, commands, and supplying of power for illuminating will be reliably obtained from the first terminal group, even if the orientation of the mechanical connections changes. Also, from the information from the second terminal group, it is possible to automatically acquire the mechanical connection relationship. A typical second terminal group is that the second terminal group of one of electrical connection unit to be coupled includes a plurality of standard terminals provide different potentials, and the second terminal group of another electrical connection units to be coupled includes a plurality of identification terminals whose connections with the plurality of standard terminals change according to the connection orientation.

The first terminal group includes a communication terminal and a power supplying terminal for supplying power to cause the light-emitting terminal to emit light. When the first terminal group and the second terminal group are disposed so as to connect in a region having a longitudinal shape and the first terminal group includes a combination of a plurality of power supplying terminals, the plurality of power supplying terminals should preferably be disposed so as to be spread out along the longitudinal shape. Due to factors such as mechanical warping of the housings, the mechanical connection units, and the electrical connection units, the electrical connections may possibly be insufficient at some part in the longitudinal direction. By spreading out a plurality of power supplying terminals in the longitudinal (length) direction, even if some of the electrical connections are insufficient, it is possible to prevent the supplying of power from being cut off and to suppress damage to the power supplying terminals due to too much load being concentrated in some of the power supplying terminals.

Another aspect of the present invention is a display system that includes a plurality of the assembly blocks described above. The display system includes at least one light-emitting group including a plurality of assembly blocks that are connected by the mechanical interfaces to other adjacent assembly blocks. In this at least one light-emitting group, the plurality of assembly blocks are also electrically connected by the first electrical interfaces and the second electrical interfaces. The display system also includes a control apparatus (display control apparatus) including a functional unit of transmitting that transmits the first data sets, the first command, and the second command to the respective assembly blocks that construct one end of each of the at least one light-emitting group.

The control apparatus preferably includes a functional unit of acquiring that acquires the information showing the connection relationships from the one or plurality of light-emitting groups and a functional unit of generating that analyzes the information showing the connection relationships and generates connection replication data (connection reproduction data) showing connection states of the plurality of assembly blocks respectively included in the one or plurality of light-emitting groups. Based on the connection replication data, the functional unit of transmitting transmits first data sets that respectively correspond to the assembly blocks included in the respective light-emitting groups to the one or plurality of light-emitting groups. Typical information showing the connection relationships includes information on the types of respective assembly blocks and information showing connection orientations between the respective assembly blocks and other assembly blocks that are adjacent to the respective assembly blocks.

The function that acquires the information (functional unit of acquiring) should preferably cause the function that transmits the first data sets (functional unit of transmitting) to transmit a fourth command, which includes a request for second data sets including information showing the connection relationships, to the respective light-emitting groups, and then receive respective second data sets of the assembly blocks included in the one or plurality of light-emitting groups following the fourth command and in accordance with an order of the assembly blocks respectively included in the one or plurality of light-emitting groups. The function that generates the connection replication data (functional unit of generating) should preferably generate the connection replication data in accordance with the order in which the second data sets were received. The functional unit of transmitting reorders the first data sets for displaying on the display system based on the connection replication data and transmits the reordered first data sets to the one or plurality of light-emitting groups.

Yet another aspect of the present invention is a control apparatus for a display unit comprising a plurality of the assembly blocks described above. The control apparatus includes: a functional unit of transmitting that transmits the first data sets, the first command, and the second command to assembly blocks that construct one end of each of one or plurality of light-emitting groups; a functional unit of acquiring that acquires the information showing the connection relationships respectively from the one or plurality of light-emitting groups; and a functional unit of generating that analyzes information showing the connection relationships and generates connection replication data showing a connection state of the plurality of assembly blocks respectively included in the one or plurality of light-emitting groups, wherein based on the connection replication data, the functional unit of transmitting transmits first data sets that respectively correspond to the assembly blocks included in the respective light-emitting groups respectively to the one or plurality of light-emitting groups.

Yet another aspect of the present invention is a method of controlling a display system including a plurality of the assembly blocks described above. This method includes transmitting the first data sets, the first command, and the second command to assembly blocks that construct one end of each of one or a plurality of light-emitting groups.

This method preferably further includes the following steps.

1. Acquiring information showing the connection relationships respectively from the one or plurality of light-emitting groups.

2. Analyzing information showing the connection relationships and generating connection replication data showing a connection state of the plurality of assembly blocks respectively included in the one or plurality of light-emitting groups.

The step of transmitting includes transmitting first data sets that respectively correspond to assembly blocks included in the respective light-emitting groups to the one or plurality of light-emitting groups based on the connection replication data.

The step of acquiring includes transmitting a fourth command, which includes a request for second data sets including information showing the connection relationships, to the respective light-emitting groups, and receiving respective second data sets of the assembly blocks included in the respective light-emitting groups following the fourth command in accordance with an order of the assembly blocks included in the respective light-emitting groups. The step of generating includes generating connection replication data in accordance with the order in which the second data sets were received.

The step of transmitting further includes reordering the plurality of first data sets for displaying on the display system in accordance with the connection replication data and transmitting the reordered first data sets to the respective light-emitting groups.

Yet another aspect of the present invention is a program (program product) for causing a computer to function as a control apparatus (display control apparatus) of a display system including a plurality of the assembly blocks described above, wherein the control apparatus realized when the program is installed in the computer includes a function of transmitting that transmits the first data sets, the first command, and the second command to an assembly block that constructs one end of a light-emitting group.

The control apparatus realized by having the computer execute the program should preferably include: a function of acquiring that acquires the information showing the connection relationships from one or the plurality of light-emitting groups; and a function of generating that analyzes information showing the connection relationship and generates connection replication data showing a connection state of the plurality of assembly blocks. Based on the connection replication data, the function of transmitting transmits first data sets that respectively correspond to the assembly blocks included in the respective light-emitting groups to the one or plurality of light-emitting groups. It is also preferable that the function of acquiring causes the function of transmitting to transmit a fourth command, which includes a request for second data sets including information showing the connection orientations, to the respective light-emitting groups, and then receives respective second data sets of the assembly blocks included in the respective light-emitting groups following the fourth command and in accordance with an order of the assembly blocks included in the respective light-emitting groups, that the function of generating generates the connection replication data in accordance with the order in which the second data sets were received, and that the function of transmitting reorders the first data sets for displaying on the display system based on the connection replication data and transmits the reordered first data sets to the respective light-emitting groups.

A typical program (program product) is installed in a personal computer and makes it possible to use the personal computer as a display control apparatus, and can be supplied by being recorded on a suitable recording medium, such as a CD-ROM. It is also possible to distribute the program or program product using a computer network such as the Internet.

BRIEF DESCRIPTION OF THE DRAWINGS

FIG. 12 is a table showing the correspondence between the connected orientation of the assembly blocks and two orientation detection bits.

FIG. 13 is a table showing the correspondence between types of assembly block and set values of DIP switches.

FIG. 15 is a table showing command codes and appended data.

FIG. 16 is a diagram showing the data structure of profile data.

FIG. 19 is a timing chart showing how an initializing process, an extinguishing process, and an illumination process are continuously executed by a display control apparatus.

FIG. 20 is a timing chart showing the flow of communication data when a connection state enquiry command code has been transmitted by the display control apparatus.

DESCRIPTION OF CARRYING OUT THE INVENTION

Figure 1:
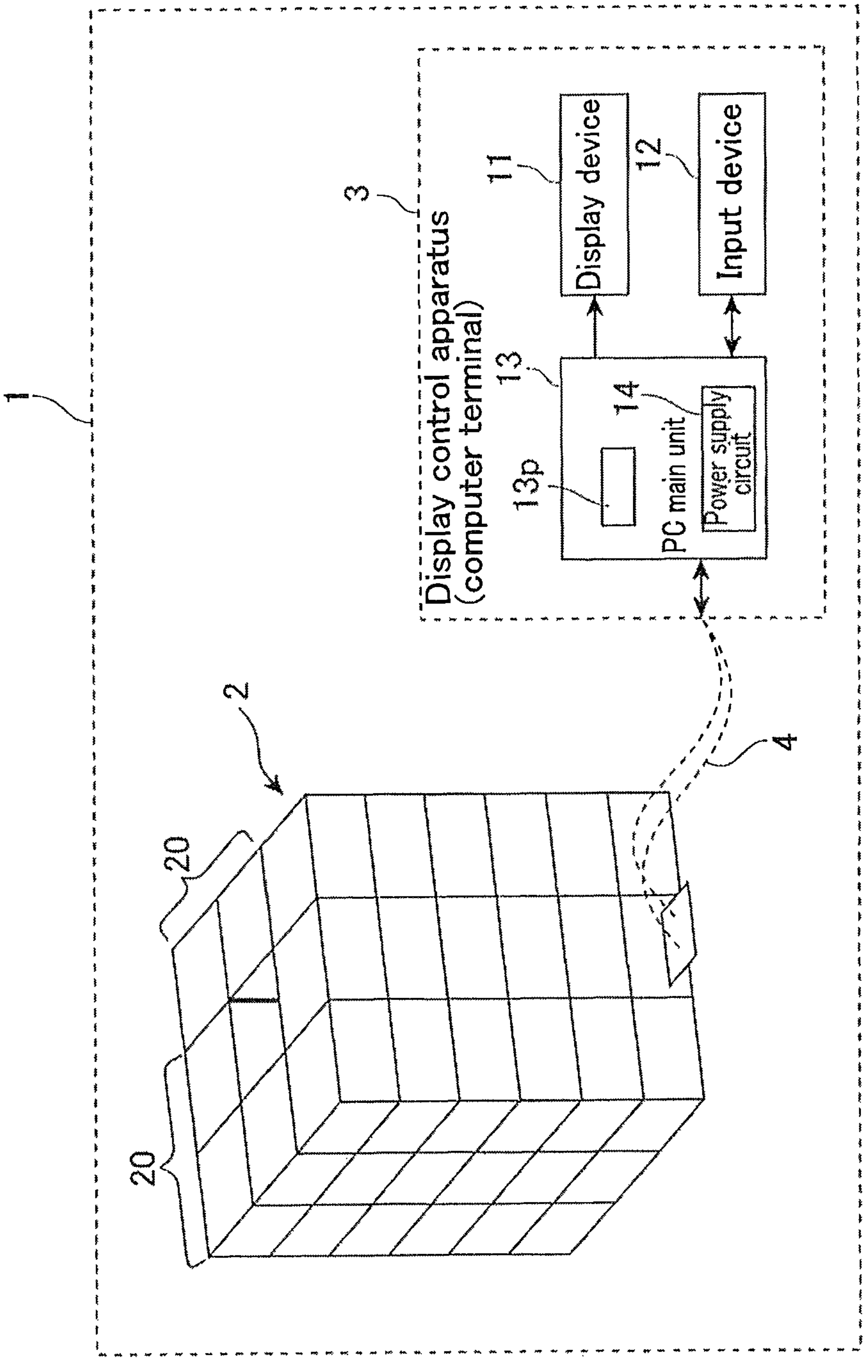
FIG. 1 shows a display system that includes a display unit produced by assembling assembly blocks.

Details will now be described with reference to the drawings. FIG. 1 is a perspective view showing a display system (light-emitting apparatus) 1 that is an embodiment of the present invention. The display system 1 includes a display unit (light emitter) 2 where a plurality of dot modules are assembled to form a rectangular tower and a computer terminal 3 that is a controller (control apparatus) that supplies power to the display unit 2 and controls a display output (light emission) of the display unit 2. The display unit 2 and the computer terminal 3 are connected via a flat cable 4. The flat cable 4 includes power wires for supplying power from the computer terminal 3 to the display unit 2 and communication wires that transfer communication data between the computer terminal 3 and the display unit 2.

The computer terminal (personal computer) 3 that functions as a control apparatus includes a display device 11, an input device 12, and a PC (personal computer) main unit 13 and, by executing an installed program 13*p*, functions as a control apparatus for the display unit 2. The PC main unit 13 includes well-known hardware resources. In addition, the PC main unit 13 includes a power supply circuit 14 as an external power supply and supplies power to the display unit 2 by way of a predetermined voltage generated by the power supply circuit 14. Note that as a controller that supplies power to the display unit 2 and/or controls the emission of light by the display unit 2, aside from the computer terminal 3, it is possible to use a dedicated controller for a display system or the like.

The display unit 2 is produced by combining various types of assembly blocks 20 and each of the assembly blocks 20 functions as at least one dot module. Note that as described later, a "dot module" includes at least one LED (Light Emitting Diode) element (one type of "light emitting element") 51 and the emission of light by such LED element 51 is individually controlled according to received information that includes luminance data or the like. That is, a dot module is the unit or element for controlling the emission of light (i.e., the unit or element for controlling image display) by the display unit 2.

Figure 2:
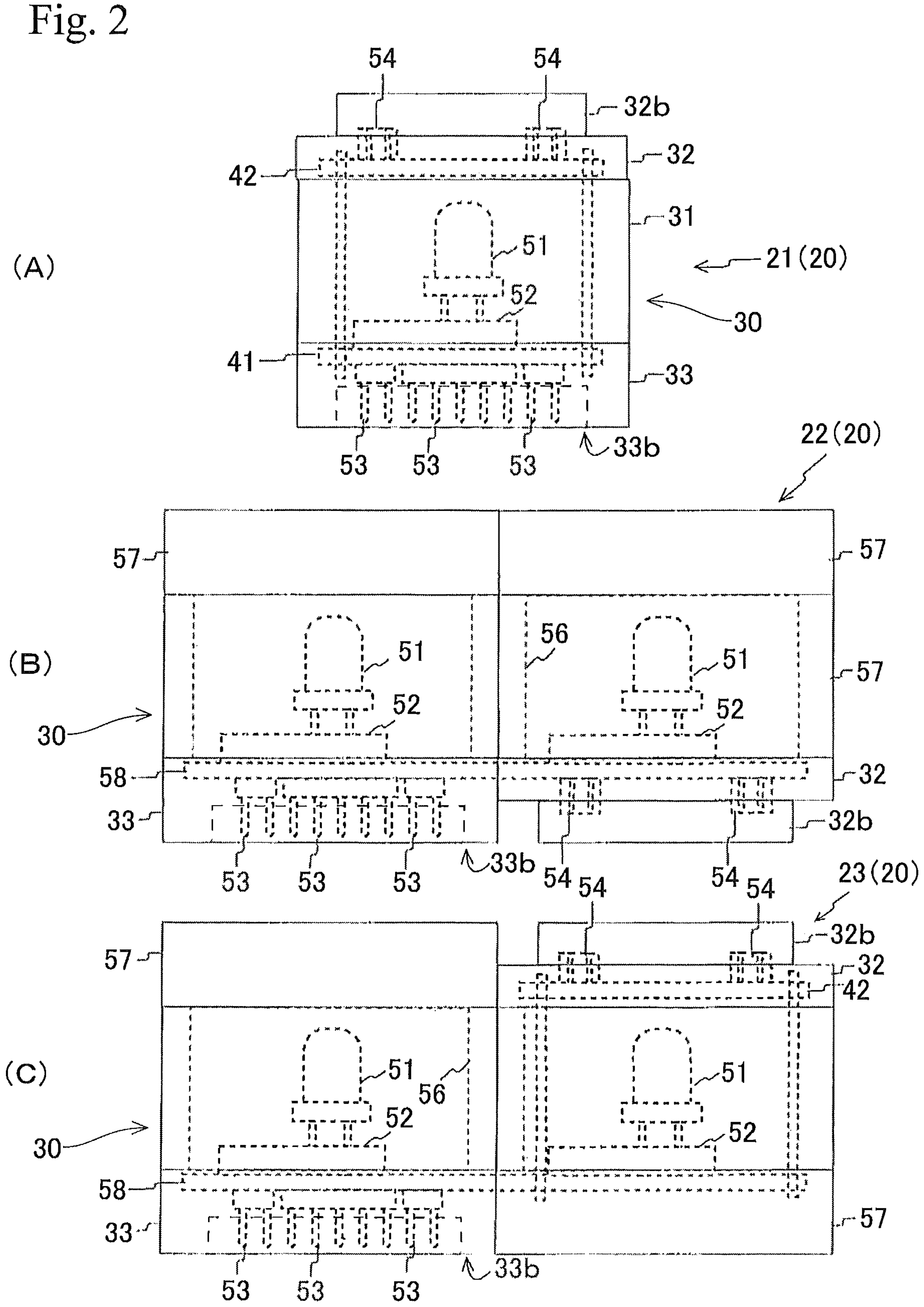
FIG. 2(A) shows a side view of a single-sized assembly block with internal configuration in broken line.
FIG. 2(B) shows a side view of a double-sized assembly block with internal configuration in broken line.
FIG. 2(C) shows a side view of a different double-sized assembly block to FIG. 2(B) with internal configuration in broken line.
Figure 3:
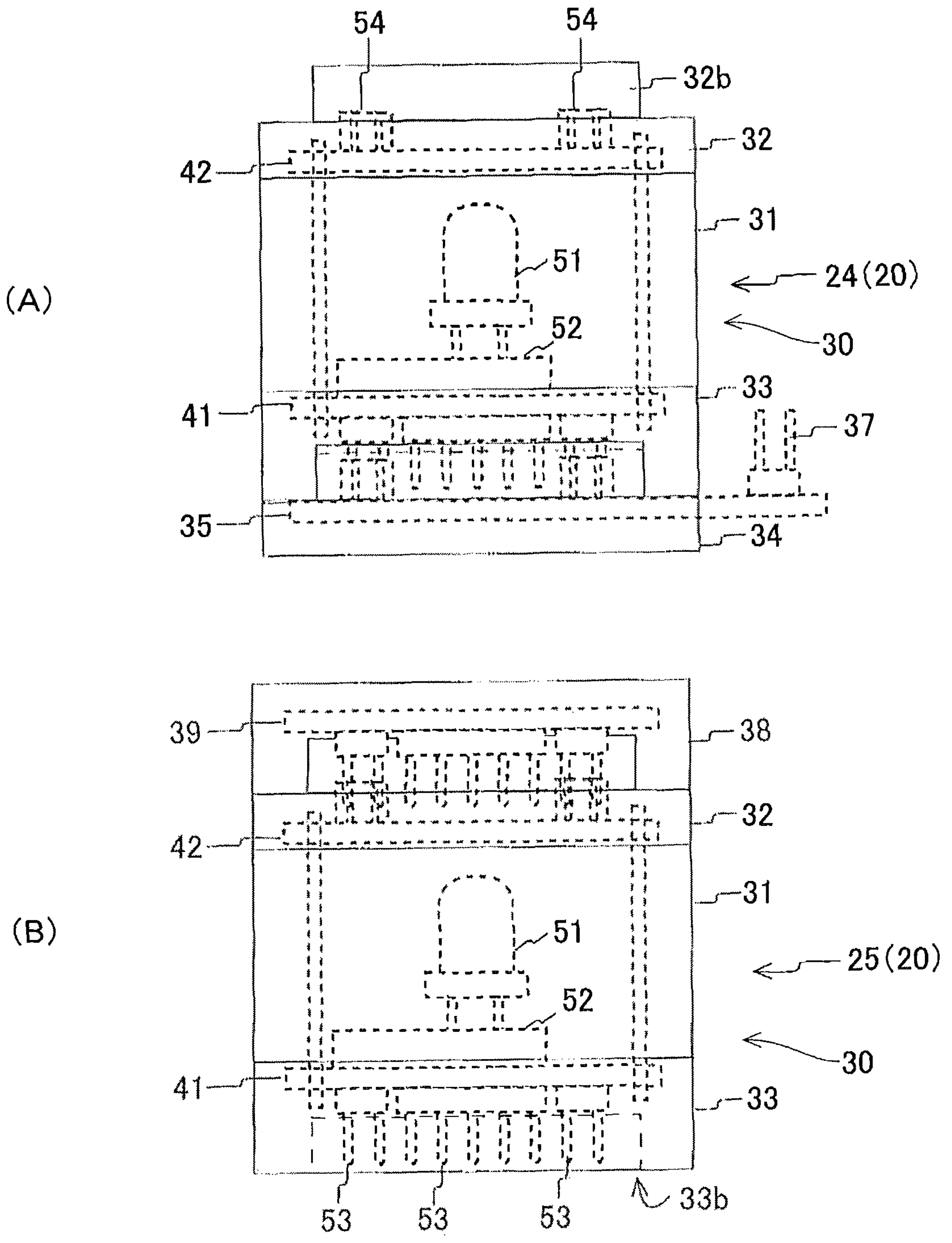
FIG. 3(A) shows a side view of a single-sized assembly block including a start connector and an input printed circuit board with internal configuration in broken line.
FIG. 3(B) shows a side view of a single-sized assembly block including an end cover with internal configuration in broken line.

FIG. 2 and FIG. 3 show side views of some types of assembly blocks (light emitting units) 20 that can be used in the display unit 2. FIG. 2A is a single block 21 that functions as one dot module. FIG. 2B is a standard block (basic block) 22 that functions as two dot modules. FIG. 2C is a block for diagonal-rising (diagonal-rising block) 23 that functions as two dot modules. FIG. 3A is a single input block 24 that can be connected to the flat cable 4 described above and has a configuration of one dot module. FIG. 3B is a single end (terminal) block 25 that returns the communication data to the computer terminal 3 and has a configuration of one dot module. Note that although not shown, aside from the above examples, the assembly blocks 20 also include a standard input block that can connect the flat cable 4 and has a configuration of the standard blocks 22, and a standard end (terminal) block that returns the communication data to the computer terminal 3 and has a configuration of the standard blocks 22.

Figure 4:
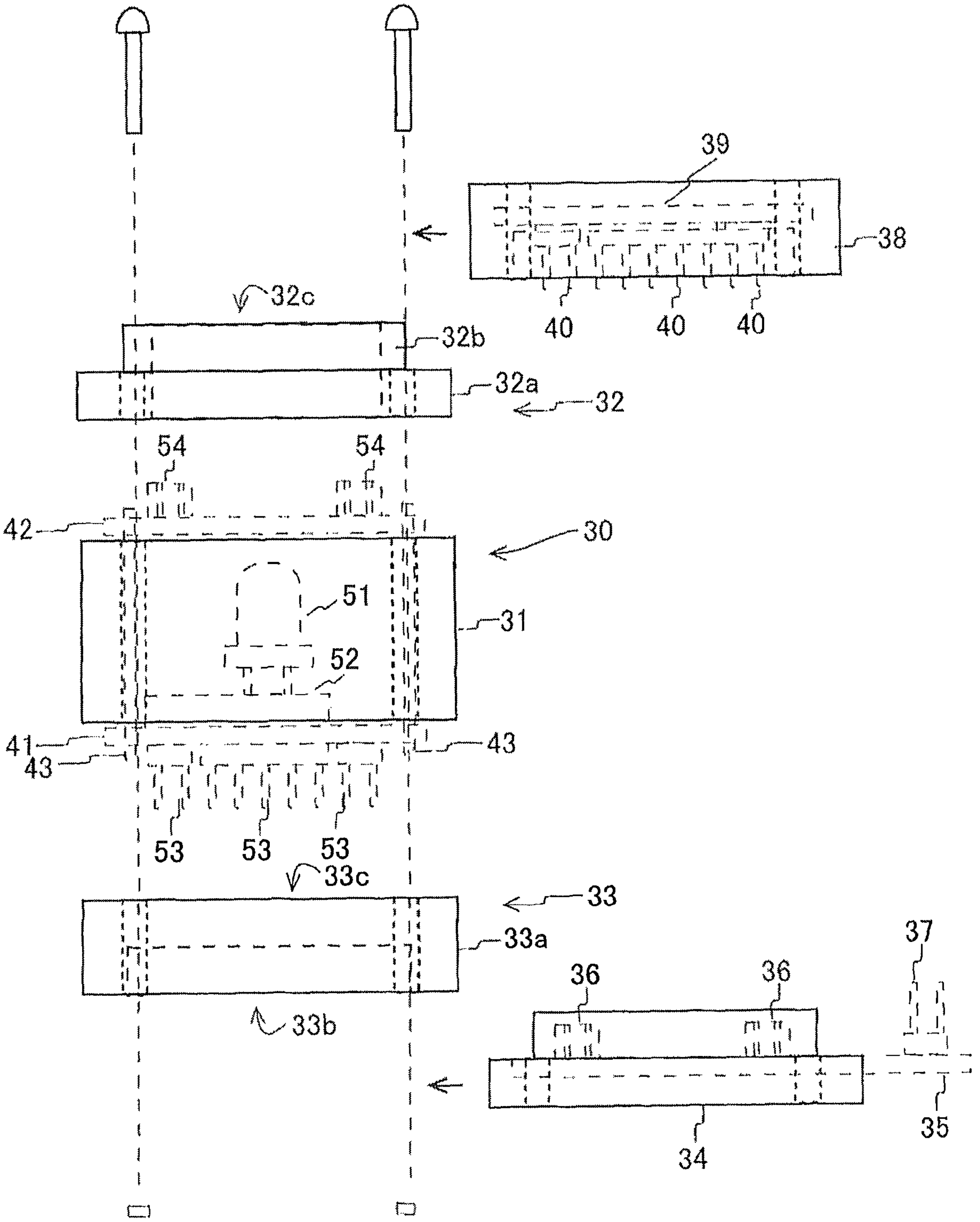
FIG. 4 is an exploded view showing the housing construction of a single-sized assembly block.

FIG. 4 is an exploded view showing the construction of a housing 30 of a single-sized assembly block 20 that functions as a single dot module. The single block 21 in FIG. 2A, the single input block 24 in FIG. 3A, and the single end block 25 in FIG. 3B are single-sized assembly blocks 20. Note that it is also possible to form input blocks and end blocks even for double-sized assembly blocks 20 described later.

The various type of the single-sized assembly blocks 20 include a common single body 31. The single body 31 has a cubic external form and has a through-hole (thought-cavity, through-space) that is rectangular in cross-section and passes through from an upper surface of the single body 31 to a lower surface thereof. This means the single body 31 is a frame construction composed of four side surface portions.

The housing 30 of the single block 21 in FIG. 2(A) includes a convex skirt 32, the single body 31, and a concave skirt 33. The convex skirt 32 is disposed above the single body 31 and the concave skirt 33 is disposed below the single body 31. In the single block 21, the convex skirt 32, and the concave skirt 33 are integrated with the single body 31 by screwing the four corners thereof to the single body 31. The convex skirt 32 of each assembly block 20 can be fitted into the concave skirt 33 of another assembly block 20. By doing so, each assembly block 20 can be mechanically connected to another assembly block 20 of any type. That is, the convex skirt 32 and the concave skirt 33 are mechanical interfaces that are provided on a first side and a second side for mechanically connecting the housing 30 to the external (periphery).

The expressions "first side" and "second side" that specify such mechanical interfaces sometime mean the case described below where such terms are respectively associated with an input side (a "first electrical interface") and an output side (a "second electrical interface) for electric signals. Here, "association" of the first mechanical interface and the first electrical interface sometime means a case where the first mechanical interface and the first electrical interface are connected and disconnected together (i.e., at the same time), and directly or indirectly connection with other electrical interface becomes on and off accordingly. "Association" of the first mechanical interface and the first electrical interface also sometime means a case where the first electrical interface is connected, either directly or via another control unit or circuit, to the electrical and/or optical connector that is connected and disconnected together with the first mechanical interface. This also applies to "association" of the second mechanical interface and the second electrical interface is also the same. The expression "mechanical interface" sometime means mechanical interface used to realize a mechanical connection only which does not achieve the inputting and/or outputting of electrical signals. In addition, the convex skirt 32 and the concave skirt 33 shown in this example may be associated with either one of the input side and the output side for electrical signals, and the association with both the inputting and outputting of signals described below is merely an example for illustration purposes. On the single block 21 shown here, the convex skirt 32 is provided above the housing 30, the concave skirt 33 is provided below the housing 30, and the single block 21 can be connected to other assembly blocks 20 above and below.

In addition, the convex skirt 32 and the concave skirt 33 can be fitted together freely an orientation chosen from four orientations of the cubic shape. That is, the convex skirt 32 and the concave skirt 33 are typical examples of mechanical connection units that can be connected to the concave skirt 33 and the convex skirt 32 of the housings 30 of different assembly blocks 20, and the connection orientations thereof, that is, the orientations of the connections between the housing 30 of the present assembly block 20 and the housings 30 of the other assembly blocks 20, can be changed. As a result, a plurality of types of assembly blocks 20 can be freely or flexibly combined to form a three-dimensional shape.

As shown in FIG. 4, the convex skirt 32 has an approximately plate-like portion 32*a*, which is rectangular and is the same size as the external form of the single body 31, and a convex portion 32*b* that projects from the upper surface of the plate-like portion 32*a*. Inside the convex portion 32*b*, the convex skirt 32 has a hole 32*c* that is communicated with the through-cavity of the single body 31 when the convex skirt 32 and the single body 31 are combined each other.

The concave skirt 33 has an approximately plate-like portion 33*a* that is rectangular and has the same size as the external form of the single body 31 and a concave portion 33*b* that is formed on the lower surface of the plate-like portion 33*a*. In the concave portion 33*b*, the convex portion 32*b* of a convex skirt 32 can be fitted into. Inside the concave portion 33*b*, the concave skirt 33 has a hole 33*c* that is communication with the through-cavity of the single body 31 when the concave skirt 32 and the single body 31 are combined each other.

Compared to the single block 21 shown in FIG. 2(A) described above, the housing 30 of the single input block 24 shown in FIG. 3(A) is composed of the convex skirt 32, the single body 31, the concave skirt 33, and an input cover 34. The input cover 34 is disposed below the concave skirt 33. The convex skirt 32, the concave skirt 33, and the input cover 34 are integrated with the single body 31 by screwing the four corners thereof to the single body 31.

As shown in the lower right part of FIG. 4, the input cover 34 has approximately the same shape and structure as the convex skirt 32. An input printed circuit board 35 is disposed inside the input cover 34. One end portion of the input printed circuit board 35 passes through a hole that is formed in a side surface of the input cover 34 and protrudes out of the input cover 34. Also, on the input printed circuit board 35, two female connectors 36 are disposed inside a concave portion 34*a* and a connector 37 for the flat cable 4 is disposed on the outside. The two female connectors (internal type connectors) 36 are disposed at the same positions as two female connectors 54 of a sub-printed circuit board 42, described later, and in a state where the input cover 34 has been integrated with the single body 31, the female connectors 36 are connected to male connectors (external type connectors) 53 of a main printed circuit board 41, described later.

Also, the housing 30 of the single end block 25 in FIG. 3B is composed of an end cover 38, the convex skirt 32, the single body 31, and the concave skirt 33. The end cover 38 is disposed above the convex skirt 32. The end cover 38, the convex skirt 32, and the concave skirt 33 are integrated with the single body 31 by screwing the four corners thereof to the single body 31.

As shown in the upper right part of FIG. 4, the end cover 38 has approximately the same shape and structure as the concave skirt 33. An end printed circuit board 39 is disposed inside the end cover 38. Four male connectors 40 are disposed on the end printed circuit board 39. The four male connectors 40 are disposed at the same positions as the four male connectors 53 of the main printed circuit board 41, described later, and in a state where the end cover 38 is integrated with the single body 31, the male connectors 40 are connected to the female connectors 54 of the sub-printed circuit board 42, described later.

The single body 31, the convex skirt 32, the concave skirt 33, the input cover 34, the end cover 38, a double body 55 (described later), and the like that are used as the housing 30 of the assembly blocks 20 are formed from a translucent plastic material. Typically, the housing 30 is formed of a milky-white plastic material that is translucent. This means that each assembly block 20 that functions as one or a larger number of dot modules will transmit the light emitted by the LED element 51 disposed thereinside substantially uniformly across substantially its entire surface. That is, the assembly block 20 will emit light in three dimensions for each dot module based on the light emitted by the LED element 51.

The single-sized main printed circuit board 41 and the single-sized sub-printed circuit board 42 are disposed inside the housing 30 of a (single-sized) assembly block 20. The main printed circuit board 41 and the sub-printed circuit board 42 are electrically connected by four lead wires 43. The four lead wires 43 are used as part of a VCC circuit 72, part of a ground circuit 71, part of a serial communication circuit 73, and part of a return circuit 74, described later.

The LED element 51 and a dot control IC (integrated circuit) 52 are mounted on the upper surface of the main printed circuit board 41 and the four male connectors 53 are mounted on the lower surface. The main printed circuit board 41 is disposed below the single body 31. The dot control IC 52 is a control means (or "control unit" or "dot control unit") that controls the emission of light by the LED element 51. That is, the main printed circuit board 41 is a light-emitting system that is held inside the translucent housing 30 and includes the light-emitting element 51 and the control unit (dot control IC) 52 which includes a function for controlling the light outputted from the light-emitting element 51.

In addition, the female connectors 54 are disposed by the sub-printed circuit board 42 above the housing 30 where the convex skirt 32 is provided, the male connectors 53 are disposed below the housing 30 where the concave skirt 33 is provided, and the male connectors 53 and the female connectors 54 are electrically connected to electrical interfaces 79*a* and 79*b* of the dot control IC 52. Accordingly, the male connectors 53 and the female connectors 54 are electrical connection units.

In the assembly blocks 20, the convex skirt 32 that is a mechanical connection unit is hollow and the female connectors 54 appear inside the convex skirt 32. Similarly, the concave skirt 33 that is a mechanical connection unit is also hollow so that the convex skirt 32 can enter inside, and the male connectors 53 appear inside of the concave skirt 33. This means that when the assembly block 20 is mechanically coupled (connected) to another assembly block 20 by the convex skirt 32 and the concave skirt 33, an electrical connection is also achieved via the male connectors 53 and the female connectors 54. That is, the assembly blocks 20 includes a system where the male connectors 53 and the female connectors 54 that are the electrical connection units are automatically (autonomously) electrically connected by mechanically connecting the convex skirt 32 and the concave skirt 33 that are the mechanical connection units. This is also the same for other types of assembly block 20.

Figure 5:
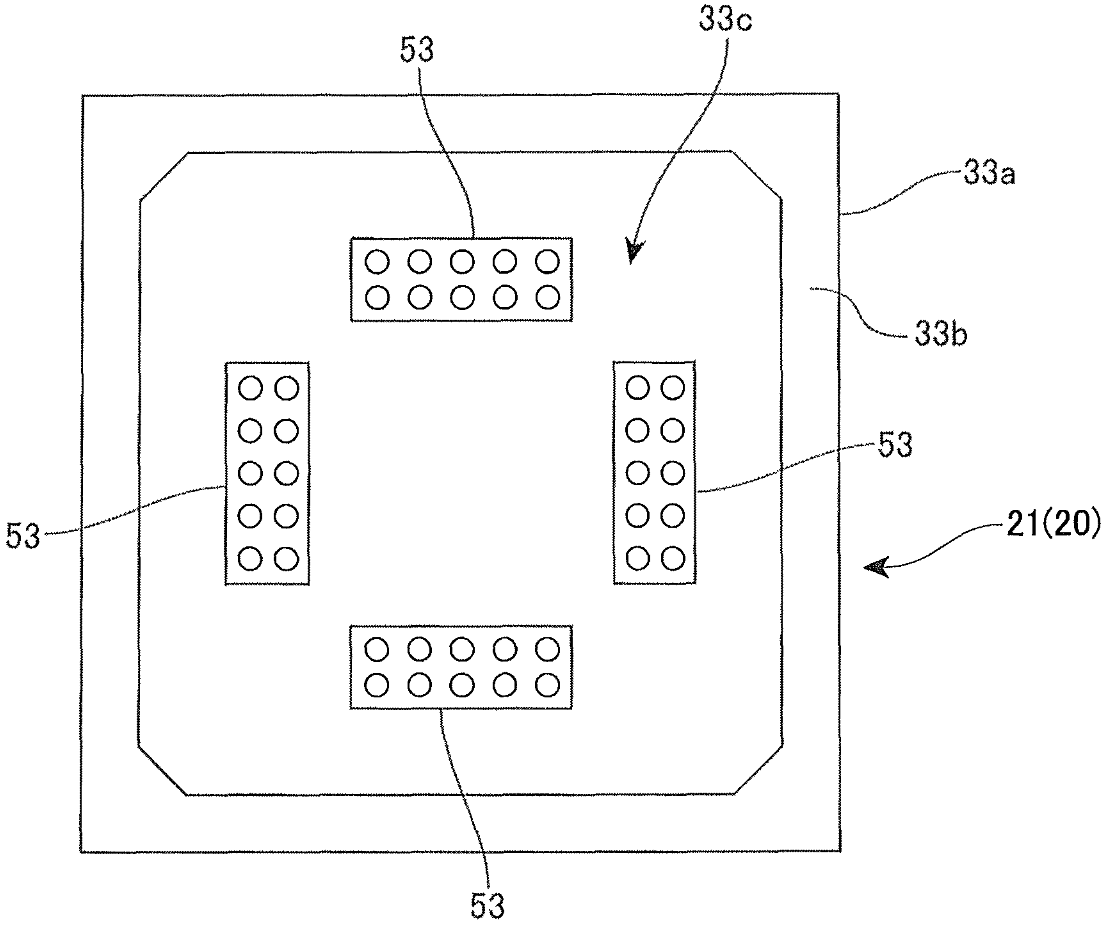
FIG. 5 is a diagram showing the layout of male connectors (external type connectors) on a single-sized assembly block.

FIG. 5 shows the layout of the four male connectors 53 on a single-sized assembly block 20. FIG. 5 is actually a bottom view of the single block 21. The four male connectors 53 are disposed along the side surfaces of the single body 31 that is in the form of a rectangular frame with a positional relationship that produces approximate point symmetry with respect to the center of the single body 31.

Two female connectors 54 are mounted on the upper surface of the sub-printed circuit board 42. The sub-printed circuit board 42 is disposed above the single body 31.

Figure 6:
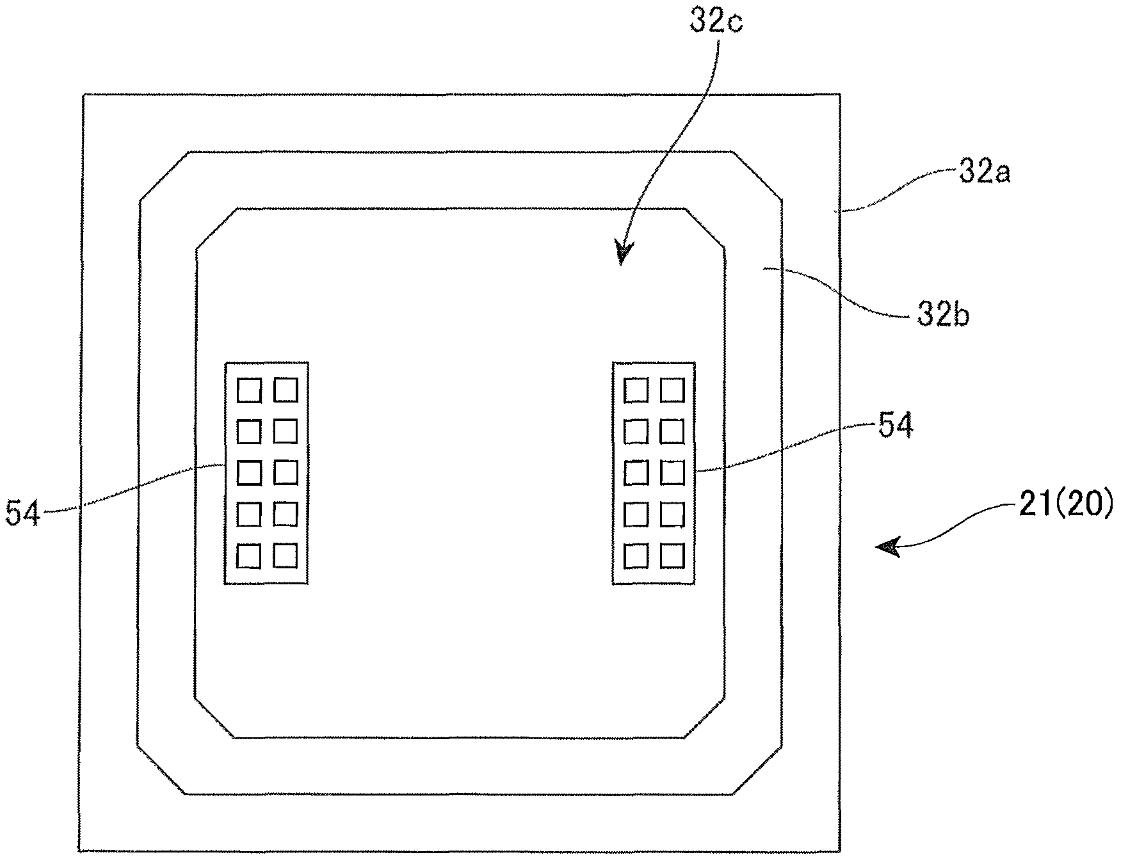
FIG. 6 is a diagram showing the layout of female connectors (internal type connectors) on a single-sized assembly block.

FIG. 6 shows the layout of the two female connectors 54 on a single-sized assembly block 20. FIG. 6 is actually a top view of the single block 21. The two female connectors 54 are disposed along a pair of facing side surfaces of the single body 31 that is in the form of a rectangular frame with a positional relationship that produces approximate point symmetry with respect to the center of the single body 31.

Compared to the single-sized assembly block 20 that is equipped with a housing 30 that has a typical unit (the unit) of three-dimensional shape (3D shape) described above, the double-sized assembly blocks 20 illustrated in FIGS. 2B and 2C have a housing 30 with a common double sized body (double body) 55 produced by integrating two single bodies 31. That is, the double body 55 of a double-sized assembly block 20 is shaped as a rectangular solid that is long in one direction and has a first unit 3D shape part (first cubic part, first cube) and a second unit 3D shape part (second cubic part, second cube). An internal wall portion (partition wall) 56 is formed between the two cubes. The partition wall has double the thickness of the side portions of the single body 31. By interposing the partition wall portion 56 between the two cubes, transmission of the light emitted by the LED element 51 in one of the cubes (dot modules) into the other of the cubes (dot modules) is prevented. That is, the cubes (dot modules) are optically separated within the double body 55. This means that mixing of colors between the two cubes (dot modules) that have been integrated is prevented and the respective cubes (dot modules) can emit light with respective luminances according to the respective control colors. For example, it is possible to prevent a cube (dot module) that is to light up dimly from becoming bright due to light from the other cube (dot module) integrated with such cube (dot module). This is also the same for a assembly blocks 20 with a housing 30 equipped with three or more parts of the unit 3D shape.

The housing 30 of the standard block 22 shown in FIG. 2(B) includes the double body 55, the convex skirt 32, the concave skirt 33, and two caps 57. The caps 57 seal through-cavities of the double body 55 respectively and prevent dust and the like from entering inside the housing 30. In the standard block 22 shown in FIG. 2(B), the convex skirt 32 and the concave skirt 33 are disposed in a line below the double body 55. The two caps 57 are disposed in a line above the double body 55. When the housing 30 has an external form where a plurality of unit 3D shapes that are interconnected, the convex skirts 32 that may be the mechanical interface on the first side and the concave skirts 33 that may be the mechanical interface on the second side may be disposed to differ in the up-down direction and/or to be provided on different unit 3D shape parts. It is possible to connect other assembly blocks 20 to the housing 30 of a given assembly block 20 not only in the up-down direction but also in a horizontal direction (the left-right direction, the front-rear direction). The two caps 57 may be integrated in some skirts.

Inside the housing 30 of the standard block 22, a double-sized main printed circuit board 58 is disposed. The main printed circuit board 58 for a standard block 22 is disposed below the double body 55. LED elements 51 and dot control ICs 52 for dot modules (cubes) respectively are mounted on the surface of the main printed circuit board 58 for the standard block 22, and a light-emitting system of the double size is configured with the main printed circuit board 58 as a base. Four male connectors 53 and two female connectors 54 are disposed on the rear surface of the main printed circuit board 58 for the standard block 22. The four male connectors 53 are disposed inside the concave skirt 33 and the two female connectors 54 are disposed inside the convex skirt 32.

That is, the housing 30 of the standard assembly block 22 includes one dot module (the first unit 3D shape part) and another dot module (the second unit 3D shape part). The main printed circuit board 58 that is a light-emitting system of the assembly block 22 is double-sized and includes one light-emitting element (first light-emitting element) 51 disposed in one dot module and another light-emitting element (second light-emitting element) 51 disposed in another dot module, and a first control unit (dot control IC) 52 of the first light-emitting element 51 and a second control unit (dot control IC) 52 of the second light-emitting element 51. The two dot control ICs 52 are connected above the main printed circuit board 58.

Accordingly, in a multiple-dot assembly block 22, the first electrical interface of the second control unit 52 is connected to the first control unit 52 on the main printed circuit board 58 and is associated via the first control unit 52 with the convex skirt 32 or the concave skirt 33 that is a first side mechanical interface (mechanical connection unit). The second electrical interface of the first control unit 52 is connected to the second control unit 52 on the main printed circuit board 58 and is associated via the second control unit 52 with the concave skirt 33 or the convex skirt 32 that is a second side mechanical interface (mechanical connection unit).

The housing 30 of the diagonal-rising block 23 shown in FIG. 2(C) includes the double body 55, the convex skirt 32, the concave skirt 33, and two caps 57. The convex skirt 32 and one cap 57 are disposed in a line above the double body 55. The concave skirt 33 and the other cap 57 are disposed in a line below the double body 55. Also, the convex skirt 32 and the concave skirt 33 are disposed in alignment with different through-cavities. Accordingly, in the diagonal-rising block 23, the convex skirt 32 is disposed diagonally above the concave skirt 33.

The double-sized main printed circuit board 58 and the single-sized sub-printed circuit board 42 on which the two female connectors 54 have been mounted are disposed inside the housing 30 of the diagonal-rising block 23. The main printed circuit board 58 of the diagonal-rising block 23 is disposed below the double body 55. The sub-printed circuit board 42 is disposed inside the convex skirt 32 above the double body 55.

The LED element 51 and the dot control IC 52 are mounted for each dot module on the surface of the main printed circuit board 58 of the diagonal-rising block 23. Four male connectors 53 are disposed on the rear surface of the double-sized main printed circuit board 58 of the diagonal-rising block 23. Four male connectors 53 are disposed inside the concave skirt 33.

The plurality of types of assembly blocks 20 shown in FIG. 2 and FIG. 3 have the construction described above. The convex skirts 32 of the respective assembly blocks 20 can be fitted onto the concave skirts 33 of other assembly blocks 20. By doing so, each assembly block 20 can be connected to assembly blocks 20 of other types. The convex skirt 32 and the concave skirt 33 can be fitted together freely in four directions based on the three-dimensional shapes thereof. As a result, it is possible to form a three-dimensional shape by freely combining a plurality of types of assembly blocks 20.

Figure 7:
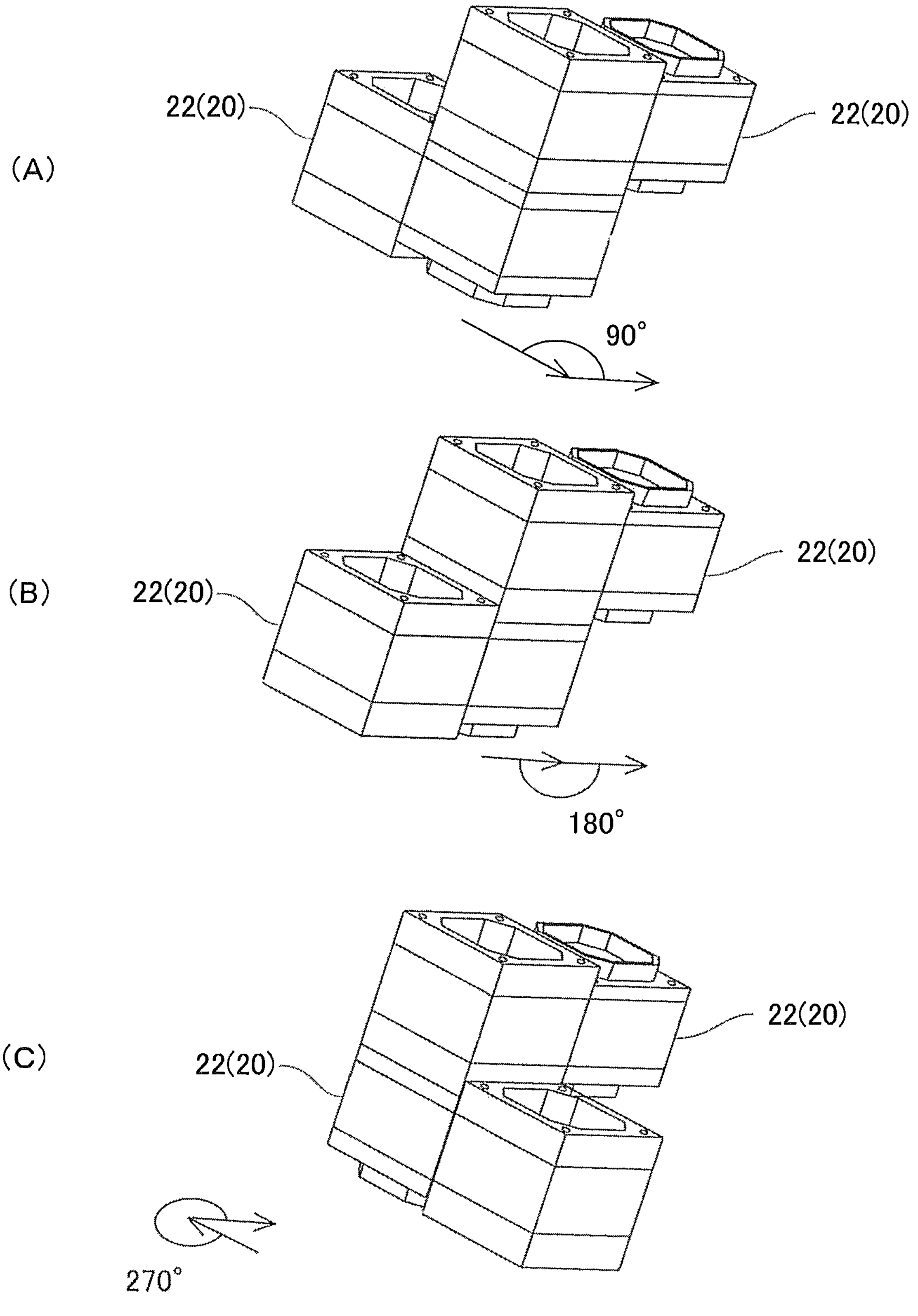
FIG. 7(A) shows a state where two standard blocks are connected at 90°.
FIG. 7(B) shows a state where two standard blocks are connected at 180°.
FIG. 7(C) shows a state where two standard blocks are connected at 270°.

FIG. 7 explains that the connection orientation between two standard blocks 22 can be chosen flexibly. As the connection orientation of (between) two standard blocks 22, one out of three different orientations can be freely chosen. FIG. 7(A) shows the state where two standard blocks 22 have been connected so that the respective longitudinal (length) directions thereof are 90 degrees apart. In this connected state, the two female connectors 54 of the lower standard block 22 below are electrically connected to the two male connectors 53 that are aligned in the shorter-side direction on the upper standard block 22 and judge the upper standard block 22 being connected so as to make an angle of 90° relative to the lower standard block 22.

FIG. 7(B) shows the state where two standard blocks 22 have been connected so that the longitudinal directions thereof are aligned in a straight line. In this connected state, the two female connectors 54 of the lower standard block 22 are electrically connected to two male connectors 53 that are aligned in the longer-side direction on the upper standard block 22 and judge the upper standard block 22 being connected so as to make an angle of 180° relative to the lower standard block 22.

FIG. 7(C) shows the state where two standard blocks 22 have been connected so that the longitudinal directions thereof are rotated by 90° in the opposite direction to FIG. 7(A). In this connected state, the two female connectors 54 of the lower standard block 22 are electrically connected to two male connectors 53 that are aligned in the shorter-side direction on the upper standard block 22 and judge the upper standard block 22 being connected so as to make an angle of 270° with respect to the lower standard block 22.

As described above, it is possible to connect the various types of assembly blocks 20 shown in FIGS. 2 and 3 to other assembly blocks 20 with an orientation selected fundamentally with freedom out of four directions while achieving an electrically connection between the male connectors 53 and the female connectors 54. By using freedom of at least two orientations composed of a straight line and rotation by 90°, it is possible to assemble a three-dimensional display unit 2 using the assembly blocks 20. As shown in FIGS. 7(A) to 7(C), the mechanical connection units of the convex skirt 32 and the concave skirt 33 are provided on the respective housings of the assembly blocks 20 so that the housings 30 can be mechanically connected in a state where part of the housing 30 of another assembly block 20 that is adjacent (in this example, adjacent in the up-down direction) and part of the housing 30 of a present assembly block 20 are overlapping. Accordingly, the electrical connection units of the male connectors 53 and the female connectors 54 are also provided on the respective housings 30 so as to be connected and allow communication with the adjacent assembly block 20 that has been connected so as to overlap the present assembly block 20.

This means that by combining the assembly blocks 20 shown in FIG. 2 and FIG. 3, it is possible to form a display unit (light emitter) 2 in the form of a rectangular tower as shown in FIG. 1. In such tower-shaped display unit 2, it is possible to electrically connect all of the dot modules. It is also possible to dismantle the tower-shaped display unit 2 shown in FIG. 1 and use the assembly blocks 20 that where used in the tower-shaped display unit 2 to form a display unit 2 of another three-dimensional shape. By simply fitting the assembly blocks 20 together, the user can form a three-dimensional display unit 2 of the desired three-dimensional shape. The user does not need to screw the assembly blocks 20 together. This makes assembly and disassembly operations of the display unit 2 simple.

Figure 8:
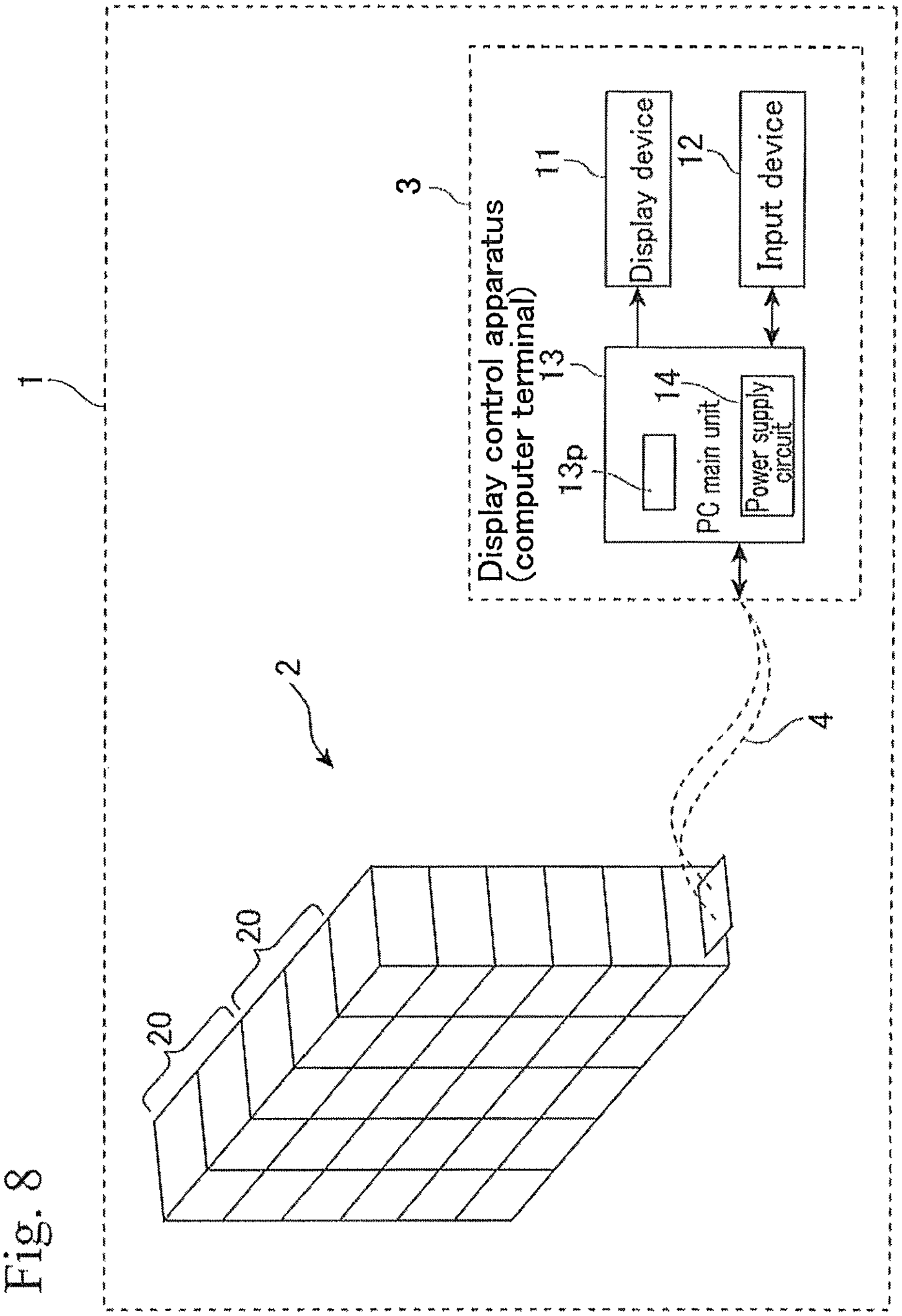
FIG. 8 schematically shows a display system including a different display unit produced by assembling assembly blocks.
Figure 9:
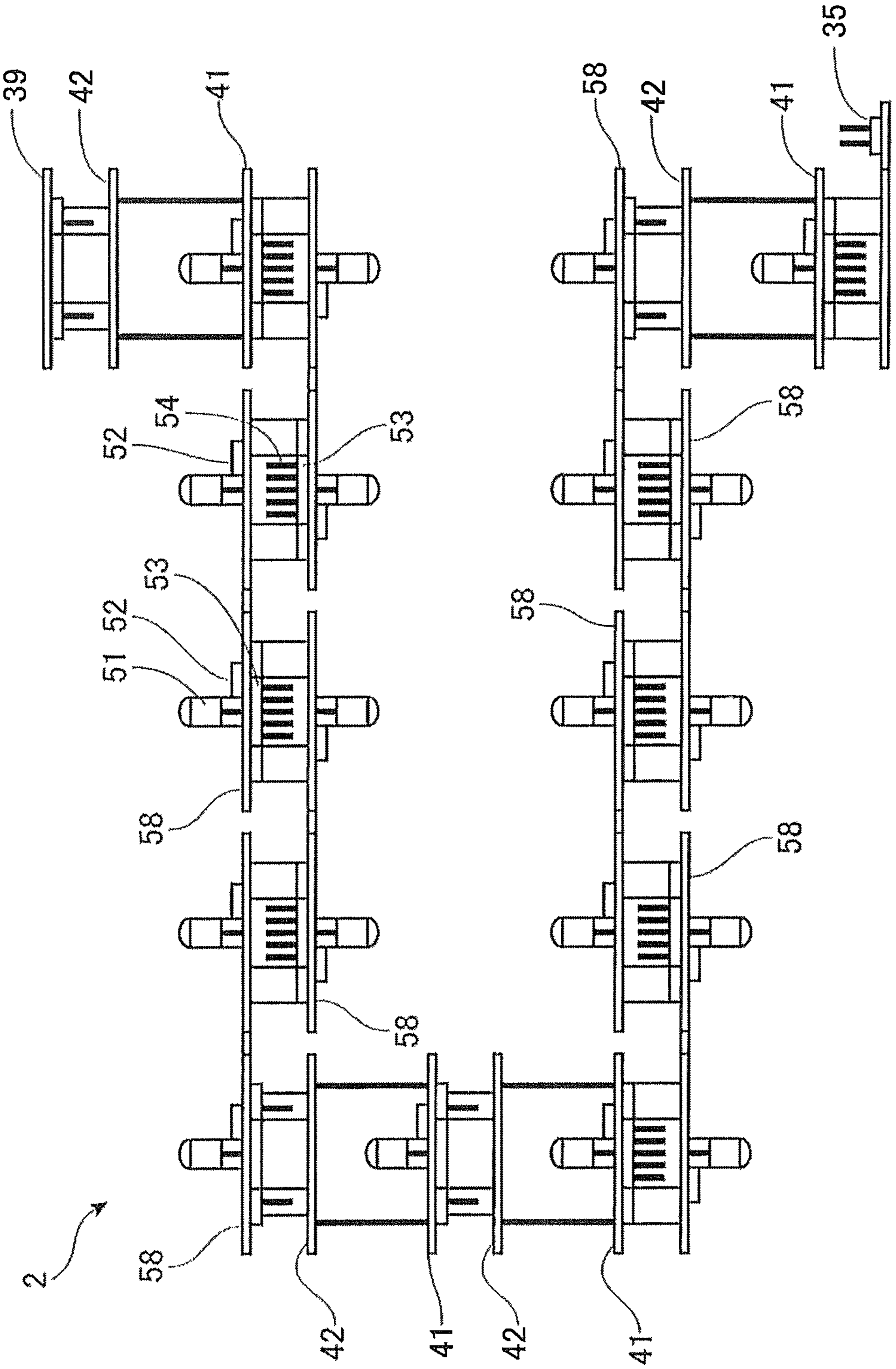
FIG. 9 shows electrical connections between the plurality of assembly blocks (dot modules) in the flat panel-shaped display unit shown in FIG. 8.

FIG. 8 is a perspective view showing a display system 1 that includes a display unit 2 in the form of a flat panel. FIG. 9 is an internal connection diagram showing the electrical connections between a plurality of assembly blocks 20 (dot modules) in the display unit 2 shown in FIG. 8 while omitting the housings 30 and focusing on the main printed circuit boards 58 that are light-emitting systems.

As shown in FIGS. 8 and 9, the flat-panel display unit 2 is formed by combining one single input block 24, two single blocks 21, one single end block 25, and eight standard blocks 22. The flat-panel type display unit 2 shown in FIG. 8 can be formed using the assembly blocks 20 and the like that were used in the tower-shaped display unit 2 shown in FIG. 1.

The single input block 24 is used on the lowest layer (level, line) at the right end in the drawings, the two single blocks 21 are used at the left end of the second and third layers (levels, lines), and the single end block 25 is used on the highest layer (level, line) at the right end in this drawing. The two standard blocks 22 on the lowest level and the two standard blocks 22 on the third level from the bottom are used with the concave skirt 33 and the convex skirt 32 facing upward and are respectively connected to the assembly blocks 20 on the next level above. The display unit 2 has a basic construction in which the assembly blocks are stacked on two levels, and the flat-panel shape are constructed stacking the basic construction where all of the dot modules are electrically connected to one another.

Figure 10:
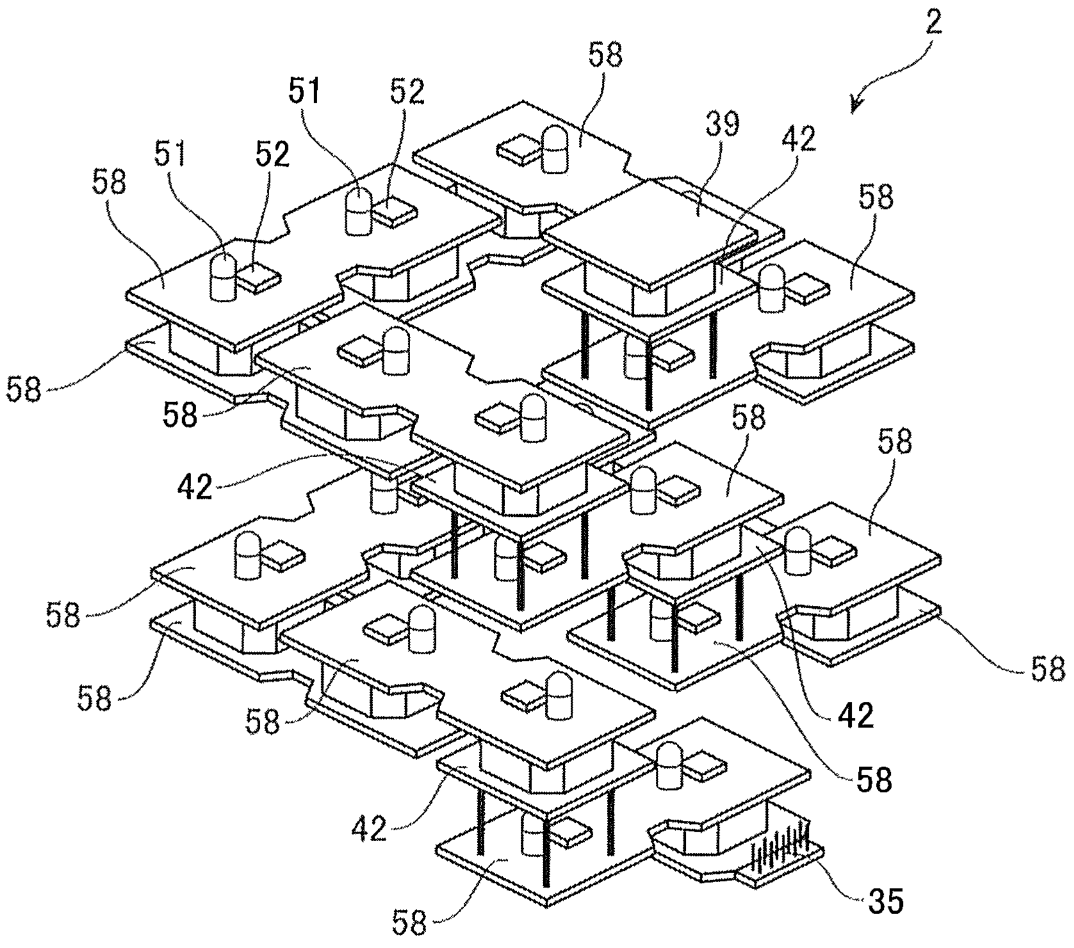
FIG. 10 shows electrical connections between the plurality of assembly blocks (dot modules) in the tower-shaped display unit shown in FIG. 1.

FIG. 10 is an internal connection diagram showing the electrical connections of the plurality of assembly blocks 20 (dot modules) in the tower-shaped display unit 2 shown in FIG. 1 while omitting the housings 30 and focusing on the main printed circuit boards 58. The tower-shaped display unit 2 shown in FIG. 1 is constructed using thirteen standard blocks 22, one diagonal-rising block 23 (on the third level from the bottom), one standard input block (lowest level), and one standard end block (the highest level). When constructing the tower shape shown in FIG. 1, as one example, four standard blocks 22 are aligned in a square frame shape to construct each level. Also, the standard blocks 22 on odd-numbered levels counting from the bottom are used with the concave skirt 33 and the convex skirt 32 facing upward and are connected to the assembly blocks 20 on the next level above. By using an assembled construction that is stacked in this way as a base unit, the plurality of assembly blocks 20 are formed into a tower shape and in such shape, all of the dot modules are electrically connected to one another.

Figure 11:
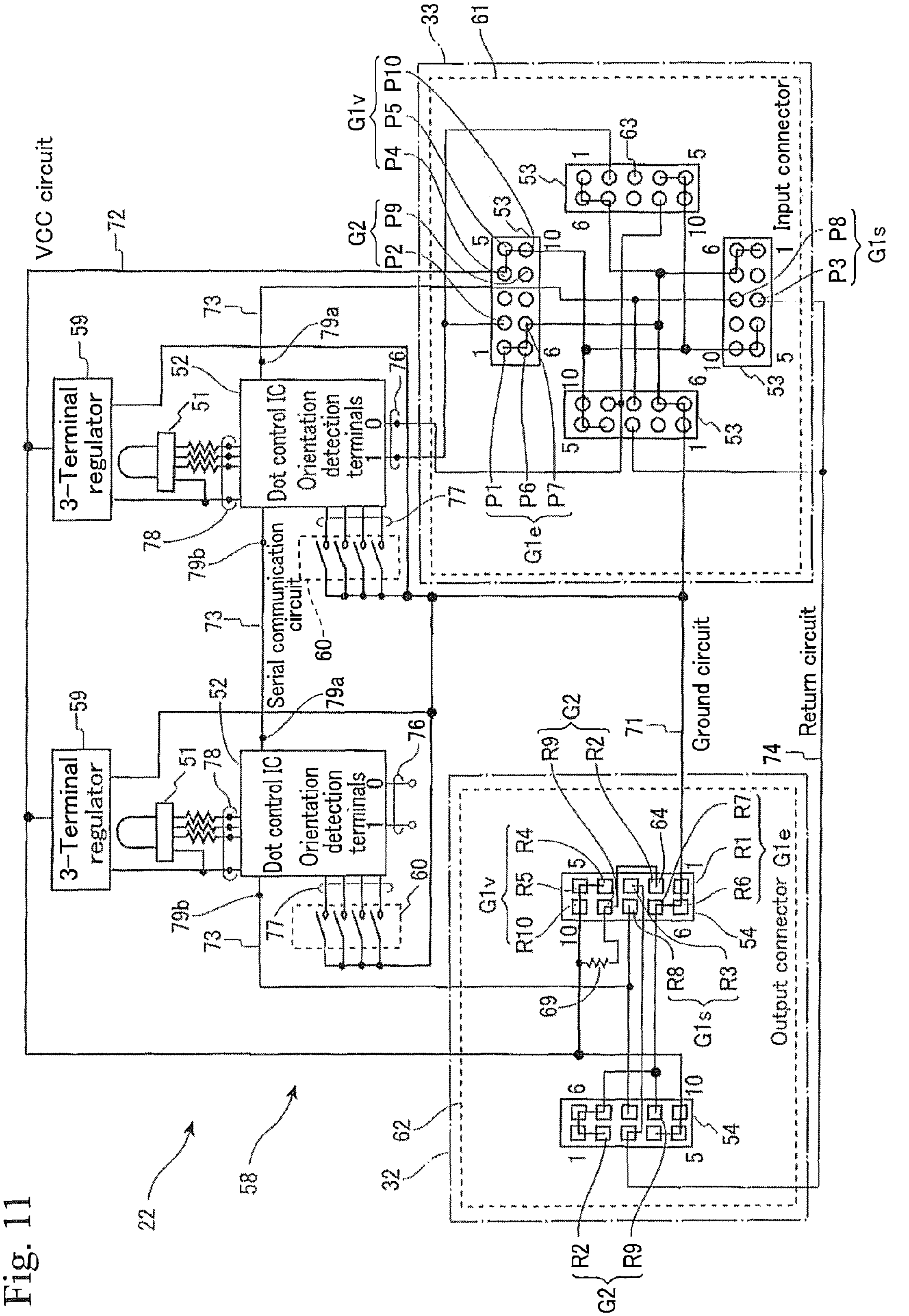
FIG. 11 is a block diagram of a light-emitting system (main printed circuit board) mounted in a double assembly block.

FIG. 11 is a wiring diagram showing the electrical connections of the main printed circuit boards (light-emitting systems) 58 mounted in the standard block 22 in FIG. 2(B). Two LED elements 51, two dot control ICs 52, two 3-terminal regulators 59, and two DIP switches 60 are mounted on the surface side of the printed circuit board 58 of the standard blocks 22 that function as two-dot modules. Each dot control IC 52 includes a data input terminal 79*a*, a data output terminal 79*b*, signal output terminal 78 that output light-emitting signals to the LED element 51, connection terminal 77 for the DIP switch 60, and an orientation detection terminal 76. An input connector (first connection portion) 61, on which a plurality of male connectors 53 that are one type of electrical connection unit are disposed, and an output connector (second connection portion) 62, on which a plurality of female connectors 54 that are the other type of electrical connection unit are disposed, are provided on a rear side of the main printed circuit board 58 of the standard block 22.

In the standard block 22, the input connector 61 on which the plurality of male connectors 53 are disposed and the output connector 62 on which the plurality of female connectors 54 are disposed are assembled so as to appear to the outside from inside the concave skirt 33 and the convex skirt 32 respectively that are the mechanical interfaces (mechanical connection units). As shown in FIG. 2(B), on the standard block 22, the input connector 61 and the output connector 62 are provided on the printed circuit board 58 and are attached onto the housing 30 so as to appear to the outside from the inside of the concave skirt 33 and the convex skirt 32 on one of the top and the bottom of the housing 30. As shown in FIG. 2(C), on the diagonal-rising block (block for connecting diagonal-rising side) 23, one of the input connector 61 and the output connector 62 is provided on the main printed circuit board 58 and the other is provided on the sub-printed circuit board 42. The main printed circuit board 58 and the sub-printed circuit board 42 are attached to the housing 30 so that the input connector 61 and the output connector 62 are divided between the top and the bottom of the housing 30 and appear to the outside from the inside of the concave skirt 33 and the convex skirt 32.

The data input terminal (first electrical interface) 79*a* of the dot control IC (first control unit) 52 on the right in FIG. 11 is connected to the input connector 61 by a communication circuit (serial communication wire) 73 of the printed circuit board 58. A data output terminal (second electrical interface) 79*b* of the dot control IC (second control unit) 52 on the left in FIG. 11 is connected to the output connector 62 by the communication circuit (serial communication wire) 73 of the printed circuit board 58. Also, the data output terminal (second electrical interface) 79*b* of the dot control IC (the first control unit) 52 on the right in FIG. 11 and the data input terminal (first electrical interface) 79*a* of the dot control IC (second control unit) 52 on the left are connected by the communication circuit (serial communication wire) 73 of the printed circuit board 58. Accordingly, one dot control IC 52, one 3-terminal regulator 59, and one DIP switch 60 are mounted on the printed circuit board 58 as control elements corresponding to one LED element 51. Also, each dot control IC 52 receives data via the data input terminal (first electrical interface) 79*a* associated with the concave skirt 33 that is the mechanical interface on the first side and outputs data via the data output terminal (second electrical interface) 79*b* associated with the convex skirt 32 that is the mechanical interface on the second side.

Each LED element 51 includes a red light emitter, a green light emitter, and a blue light emitter that are capable of emitting light according to separate control (for example, PWM (Pulse Width Modulation) control) and is capable of emitting full-color light. The LED elements 51 may alternatively be capable of emitting light of a single color, such as red, green or blue.

The input connector 61 is composed of four male connectors 53 and receives power and communication data from the output connector 62 of another assembly block 20 that is connected. The male connectors 53 each include ten pins 63 as connection terminals. The output connector 62 is composed of two female connectors 54 and supplies power and transmits communication data to the input connector 61 of another assembly block 20 that is connected. The female connectors 54 each include ten pin insertion holes 64 as connection terminals. The respective female connectors 54 can be electrically connected to the male connectors 53.

In the male connectors 53 and the female connectors 54, the ten pins 63 and the ten pin insertion holes 64 are arranged in two rows of five. When distinguishing between the plurality of pins 63 and the plurality of pin insertion holes 64 in the respective connectors in the following explanation, the numbers 1 to 10 written around the connectors in FIG. 11 will be used (in reality only "1", "5", "6", and "10" are shown in FIG. 11). Also, when distinguishing between the four male connectors 53 of the input connector 61 and the two female connectors 54 of the output connector 62 in the following explanation, the words "top", "bottom", "left", and "right" in the orientation in FIG. 11 are used. That is, the input connector 61 is composed of the top male connector 53, the bottom male connector 53, the left male connector 53, and the right male connector 53. The output connector 62 is composed of the left female connector 54 and the right female connector 54. Also, when distinguishing between the two dot control ICs 52, the two LED elements 51, the two 3-terminal regulators 59, the two DIP switches 60, and the like inside a standard block 22, parts corresponding to the input connector 61 side in FIG. 11 are labeled with the characters "input side" or "first side" and parts corresponding to the output connector 62 side in FIG. 11 are labeled with the characters "output side" or "second side".

The four male connectors 53 disposed on the input connector 61 each include ten pins 63 (P1 to P10). The two female connectors 54 disposed on the output connector 62 each include ten pin insertion holes 64 (R1 to R10), and the pins P1 to P10 are respectively inserted into the holes R1 to R10, thereby electrically connecting the pins P1 to P10 and the holes R1 to R10 respectively. In reality, two out of the four male connectors 53 of the input connector 61 of one assembly block 20 are electrically connected by insertion into the two female connectors 54 of the output connector 62 of another assembly block 20. Also, the two female connectors 54 of the output connector 62 of such assembly block 20 are electrically connected by inserting the four male connectors 53 of the input connector 61 of yet another assembly block 20. However, for ease of understanding, connection of the pins P1 to P10 and the holes R1 to R10 will be described as connection of the input connector 61 and the output connector 62 of one assembly block (standard block) 22 shown in FIG. 11.

The pins (terminal group) P1 to P10 of the male connectors 53 and the holes (terminal group) R1 to R10 of the female connectors 54 that are the electrical connection units are roughly divided into two groups. The first terminal group G1 includes the pins P1, P3 to P8, P10 and the corresponding holes R1, R3 to R8, R10. The terminal groups G1 are arranged so that electrical connections are not affected by the connection orientation of the housings 30, that is, the mechanical connection units (the convex skirt 32 and the concave skirt 33) that can be freely used for connecting in four directions. The second terminal group G2 includes the pin P2 and the pin P9 and the holes R2 and R9 corresponding thereto. The terminal groups G2 are arranged so that the connection relationship will differ according to the connection orientation of the two housings 30, that is, the connection orientations of the mechanical connection units (the convex skirt 32 and the concave skirt 33) that can be freely used for connecting in four directions, which makes it possible to distinguish among the four connection orientations.

The first terminal group G1 includes a terminal group G1*v* that is connected to the VCC wire (circuit) 72 as a power supply wire (circuit), a terminal group G1*e* that is connected to the ground wire (circuit) 71, and a terminal group G1*s* connected to a signal wire (circuit). The terminal group G1*v* is constructed of the pins P4, P5, and P10 of the male connectors 53 and the holes R4, R5, and R10 of the female connectors 54 into which the pins P4, P5, and P10 are inserted. These pins and holes are connected to the VCC wire 72 and are connected to the two 3-terminal regulators 59. The DC voltages generated by the 3-terminal regulators 59 are supplied to the dot control ICs 52 and the LED elements 51 of the respective groups on the left and the right. By doing so, power is supplied to the respective elements inside the standard block 22. In addition, power is supplied from one assembly block 20 to another assembly block 20 via the input connector 61 and the output connector 62. In the respective dot modules, a red control terminal, a green control terminal, and a blue control terminal of the LED element 51 are connected to the dot control IC 52 via the signal output terminals 78.

The terminal group G1*e* is composed of the pins P1, P6, and P7 of a male connector 53 and the holes R1, R6, and R7 of the female connector 54. Such pins and holes are connected to the ground wire 71 and make low potential or ground potential to the terminal group G1*v* that supplies power of a high potential.

The terminal group G1*s* is composed of the pins P3 and P8 of a male connector 53 and the holes R3 and R8 of the female connector 54 into which such pins are inserted. The terminal group G1*s* is a terminal group for transmitting signals and to prevent incorporation of noise, the signal line is connected to only the bottom male connector 53 and the left male connector 53 out of the four male connectors 53, so that an electrical connection is achieved with only one of the female connectors 54.

Out of the pins and the holes of the terminal group G1*s*, the pin P8 and the hole R8 are connected to the serial communication circuit (one type of signal wires) 73 that makes the transfer of communication data between assembly blocks 20 possible. That is, the pin P8 of the male connectors 53 is connected to the input terminal 79*a* of the first dot control IC 52 by the communication wire (circuit) 73. The hole R8 of the female connectors 54 is connected to the output terminal 79*b* of the second dot control IC 52 by the communication wire 73. The output terminal 79*b* of the first dot control IC 52 is connected to the input terminal 79*a* of the second dot control IC 52 by the communication circuit 73. By using this connection, each dot control IC 52 in a standard block 22 receives communication data from the input connector 61 and transmits communication data from the output connector 62. That is, the dot control IC 52 on the input side receives communication data from the input connector 61 and transmits the received communication data to the dot control IC 52 on the output side. Also, the dot control IC 52 on the output side transmits the received communication data to the dot control IC 52 on the input side of another assembly block 20 which is connected to the output connector 62.

The pin P3 and the hole R3 of the terminal group G1*s* are directly connected by the return wire (one type of signal wire) 74. The return wire (circuit) 74 is used to connect the final dot control IC 52 out of a plurality of dot control ICs 52 that are connected for making a group and the computer terminal 3.

The second terminal group G2 is a type of couple of second terminal groups to be coupled that includes standard terminals and identification terminals, the standard terminals being included in one second terminal group of an electrical connection unit and supplying with different potentials, the identification terminals being included in another second terminal group of the electrical connection unit and changing electrical connections with the standard terminals according to the connection orientation of the housings. For this reason, pins P2 and P9 of the second terminal group G2 of the male connectors 53 are respectively connected to the orientation detection terminal 76 of the dot control IC 52. More specifically, the pin P9 of the left and right male connectors 53 are connected to the bit 0 terminal of the orientation detection terminal 76 of the dot control IC 52 on the input side. The pin P2 of the top and right male connectors 53 are connected to the bit 1 terminal of the orientation detection terminal 76 of the dot control IC 52 on the input side. On the other hand, among the holes R2 and R9 of the second terminal group G2 of the female connectors 54, the holes R2 and R9 of the right female connector 54 are connected via a pull-up resistor element 69 to the VCC wire 72. The holes R2 and R9 of the left female connector 54 are connected to the ground wire 71. Accordingly, the data that appears at the orientation detection terminal 76 will differ according to which male connectors 53 and female connectors 54 are connected, and the control IC 52 is therefore able to analyze the connection orientation.

FIG. 12 is a table showing the correspondence between the connection orientation of one assembly block 20 to another assembly block 20 and the two orientation detection bits obtained by the dot control IC 52 on the input side based on the two orientation detection terminals (bit 0 and bit 1). The two orientation detection bits correspond to the levels of the two orientation detection terminals (bit 0 and bit 1). If the pin P2 and/or P9 become connected to ground by the holes R2 and/or R9, each bit will become “0”. Conversely if the pin P2 and/or P9 become connected to VCC, each bit will become “1”. The table in FIG. 12 is stored in an internal memory, not shown, of the computer terminal 3, and based on profile data, described later, is used to determine the connection orientation of each assembly block 20 relative to the next assembly block 20 upstream. The connection angles (connection orientations) of the table in FIG. 12 correspond to FIGS. 7(A) to (C).

The DIP switches 60 shown in FIG. 11 include switches for four bits and values set by the respective switches are outputted to the dot control ICs 52. FIG. 13 is a table showing the correspondence between the dot control ICs 52 and the four-bit set values of the DIP switches 60. Based on FIG. 13, as one example, "0000" is set in the DIP switches 60 corresponding to a dot control IC 52 on the input side of the standard block 22 and "1111" is set in the DIP switches 60 corresponding to a dot control IC 52 on the output side. In this way, in the DIP switches 60, different values are set corresponding to the type of assembly block 20 and the order (the order counting from the input to output) of a dot control IC 52 inside an assembly block 20. In place of the DIP switches 60, the lead wires 43 or the like may be used to fixedly connect the terminals of the dot control IC 52 to be connected to the DIP switches 60 to the VCC wire 72 and/or the ground wire 71.

Other types of assembly blocks 20 aside from the standard block 22 shown in FIG. 11 include the LED element 51, the dot control IC 52, the 3-terminal regulators 59, and the DIP switches 60 as circuits for each dot module. Each assembly block 20 includes the input connector 61 and the output connector 62. Also, the construction and wiring of the input connector 61 and the output connector 62 are the same as those of the standard block 22 shown in FIG. 11. That is, each assembly block 20 is equipped with the function described above for supplying power between blocks, the function described above for transferring communication data between blocks, the function described above for detecting the connection angle relative to the next upstream block, and the function described above for setting the dot control IC 52 using the DIP switches 60.

Figure 14:
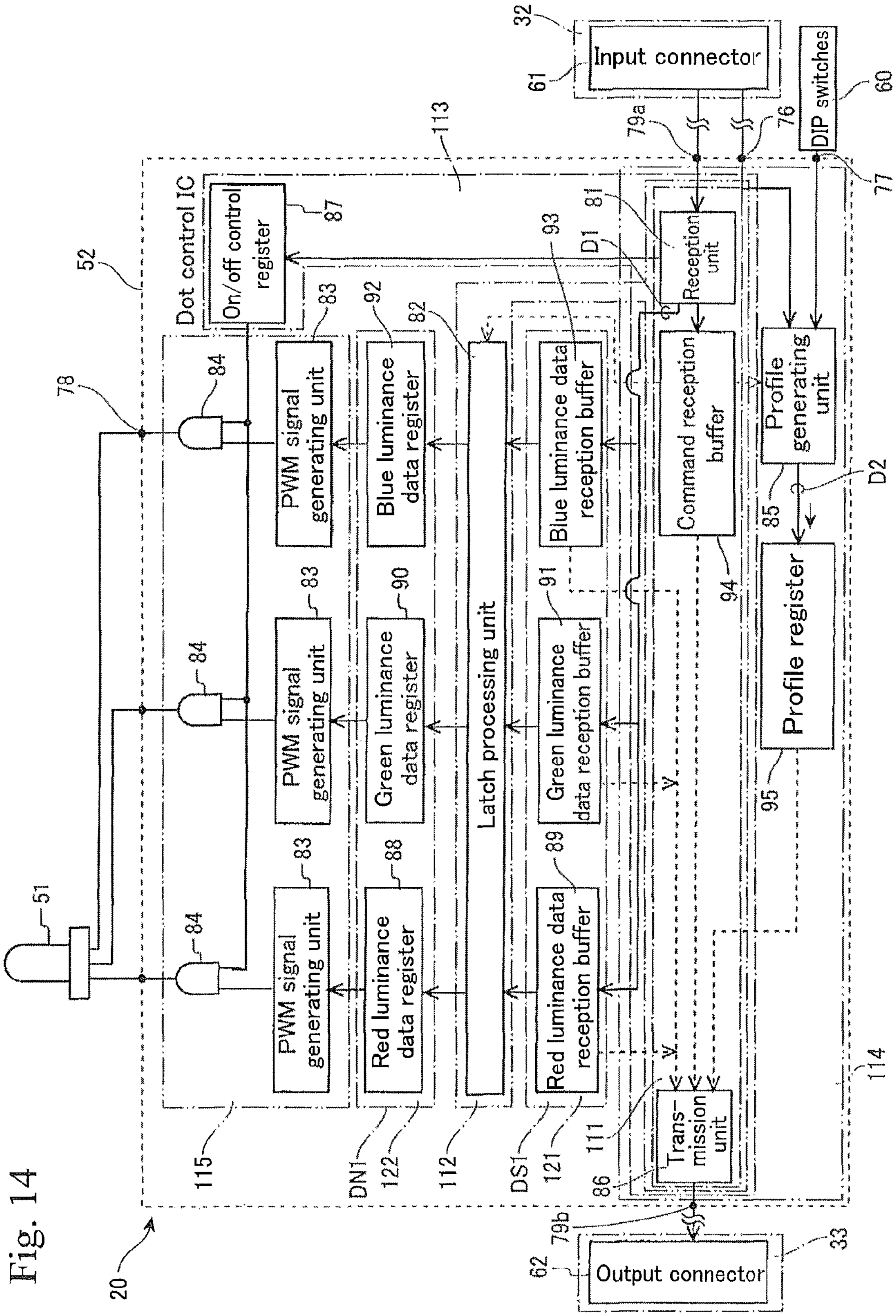
FIG. 14 is a block diagram showing functions realized by a control unit (dot control IC).

FIG. 14 is a block diagram showing the functions realized by the respective dot control ICs 52 shown in FIG. 11. The dot control ICs 52 operate as control units that include functions for controlling light outputted from the LED elements 51. One typical type of control IC 52 includes a CPU (Central Processing Unit) and a memory, and realizes desired functions by having the CPU read and execute a program, not shown, stored in the memory. Another typical type of control IC 52 has a special-purpose circuit that realizes various functions and includes an arrangement where desired functions are realized by a combination of a CPU and the special-purpose circuit. This dot control IC 52 includes functions as a reception (input) unit 81, a latch processing unit 82, three PWM signal generating units 83, three logical AND units 84, a profile generating unit 85, a transmission (output) unit 86, and the like. The memory of the dot control IC 52 includes storage regions as an on/off control register 87, a red luminance data register 88, a red luminance reception buffer 89, a green luminance data register 90, a green luminance reception buffer 91, a blue luminance data register 92, a blue luminance reception buffer 93, a command reception buffer 94, a profile register 95, and the like.

The reception unit 81 as a reception means receives communication data inputted into the serial input terminal 79*a* of the dot control IC 52 and stores such communication data in the various registers 87, 89, 81, 93, and 94. The communication data received by the reception unit 81 is communication data set of a predetermined bit length (for example, eight bits). The communication data set includes data such as command codes, luminance data, and profile data for controlling emission of light by the dot control IC 52.

FIG. 15 shows examples of command codes and appended data sent and received between the plurality of dot control ICs 52 and the computer terminal 3 that are connected. The command codes and appended data are sent and received as separate transmission data. In order from the top of the table, the types of the command codes includes a command code (80H: where H represents hexadecimal, the same applies below) that causes a dot control IC 52 to turn off the LED element 51, a command code (81H) (the "third command") that turns the LED element 51 on, a data transfer command code (83H) (the "first command") that designates a display color of the LED element 51, a latch command code (84H) (the "second command") that starts control of the illumination color according to newly transferred display color designation data, a connection state enquiry command code (FEH) (the "fourth command"), and a command code (FFH) that initializes the dot control IC 52.

The data transfer command code (83H) is a first command that designates transfer of a first data set D1 including data that controls the color of light outputted from the LED element 51. The first data set D1 includes red luminance data (R data), green luminance data (G data), and blue luminance data (B data). The most significant bit of the luminance data of each color is zero and a luminance value is designated by the remaining seven bits. The connection state enquiry command code (FEH) is the fourth command and this command is appended with a number data set for counting the number of dot control ICs 52 that are connected and profile data sets.

On receiving a command code, the reception unit 81 stores the command code in the command reception buffer 94. On receiving a luminance data set (the first data set) D1 of predetermined colors, the reception unit 81 stores the luminance data set in a data buffer 121 composed of the luminance data reception buffers 89, 91, 93 of the corresponding colors and sets the luminance data set as a stored data set (stored first data set) DS1. On receiving the command code (81H) (third command) that turns on the LED element 51, the reception unit 81 writes "1" into the on/off control register 87. On receiving the command code (80H) that turns off the LED element 51, the reception unit 81 writes "0" into the on/off control register 87.

When the latch command code (84H) (second command) has been written in the command reception buffer 94, the latch processing unit 82 writes the luminance data (the stored first data set) DS1 stored in the data buffer 121 that includes the luminance data reception buffers 89, 91, 93 of the respective colors as a next data set DN1 in a data register 122 that includes the luminance data registers 88, 90, 92 of the respective colors.

A function (means) 115 that controls emission of light by the dot control IC 52 includes the PWM signal generating units 83 and the logical AND units 84. The respective PWM signal generating units 83 read the luminance data (the next data set DN1) written in the luminance data registers 88, 90, 92 (the data register 122) of the colors that respectively correspond thereto and generate PWM signals of corresponding values. The respective logical AND units 84 calculate a logical AND between a PWM signal generated by the corresponding PWM signal generating unit 83 and a value of the on/off control register 87. When the value of the on/off control register 87 is "1", the logical AND unit 84 outputs a PWM signal, while when the value of the on/off control register 87 is "0", the logical AND unit 84 does not output a PWM signal. Accordingly, when the reception unit 81 has received a command code (81H) (the "third command") that turns on the LED element 51, "1" is set in the on/off control register 87 and the PWM signals generated based on the next data set DN1 are supplied to the LED element 51 as light emission control signals of the respective colors.

As a result, the red light emitter, the green light emitter, and the blue light emitter of the LED element 51 output an amount of light corresponding to the respective PWM signals supplied thereto. The LED element 51 emits light of a color corresponding to the combination of the values of the luminance data written into the red luminance data register 88, the green luminance data register 90, and the blue luminance data register 92. The entire dot module (cube) emits light with the emitted color of the LED element 51.

When the connection state enquiry command code (FEH) (the "fourth command") has been written into the command reception buffer 94, the profile generating unit 85 generates its own profile data. The profile generating unit 85 reads an input of the orientation detection terminal 76 and the set value of the DIP switches 60 and generates its own profile data (a second data set) D2 with a value based on such data. The profile generating unit 85 stores its own profile data D2 that has been generated in the profile register 95.

FIG. 16 shows the data structure of the profile data D2 generated by the profile generating unit 85. The profile data D2 is a communication data set that has 8-bit length and whose most significant bit is fixed at "0". The respective most significant bits of the various commands shown in FIG. 15 mentioned above are all "1". In the display system 1 according to the present embodiment, it is possible to distinguish between commands and data according to whether the most significant bit (i.e., the first bit) of the communication data set is "0" or "1".

The value (shape setting bits that show the type and the like of assembly block described above) set on the DIP switches 60 in FIG. 13 is inserted into the bits from the sixth bit to the third bit of the profile data D2. Also, a value based on the level of the two orientation detection terminals of each dot control IC 52 ("bit 1" and "bit 0": orientation detection bits showing the connection orientation with respect to another assembly block) are inserted into the first bit and the zeroth bit of the data D2.

When new communication data set has been written in the command reception buffer 94 of the dot control IC 52, the transmission unit 86 as a transmission means reads the communication data set and transmits the communication data set from the serial output terminal of the dot control IC 52. For example, when a command code has been stored in the command reception buffer 94, the transmission unit 86 reads the command code and transmits the command code from the serial output terminal.

Accordingly, the dot control IC 52 has a first function (first functional unit) 111 that includes the reception unit 81, the command reception buffer 94, and the transmission unit 86. On receiving, via the input terminal (first electrical interface) 79*a*, a first data set D1 that includes data that controls the color of the light outputted from an LED element 51 and the first command (83H) that includes a designation of transfer of such first data set D1, the first functional unit 111 stores the received first data set D1 in the data buffer 121. The first functional unit 111 also outputs the stored first data set DS1 that had been stored in the buffer 121 and the first command (83H) from the output terminal (second electrical interface) 79*b*.

The dot control IC 52 also includes a second function (second functional unit) 112 that includes the reception unit 81, the command reception buffer 94, the latch processing unit 82, and the transmission unit 86. When the second command (84H) that designates latching has been received via the input terminal 79*a*, the second functional unit 112 sets the first data set DS1 that was stored in the buffer 121 in the data register 122 as the next data set DN1 to be used by the dot control IC 52 to control the LED element 51. The second functional unit 112 also outputs the second command (84H) via the output terminal 79*b*.

The first function 111 does not transfer the data set D1 received via the input terminal 79*a* to the output terminal 79*b* as it is as a data stream, but instead sends the stored data set DS1 in the data buffer 121. Accordingly, in this system where a plurality of dot control ICs 52 are electrically and serially connected by the serial communication circuit 73, the input connectors 61, and the output connectors 62, the data set D1 being transferred will definitely be stored in the data buffer 121 managed by each dot control IC 52. In addition, first, after the received command, for example a transfer command (83H), has been transmitted from the output terminal 79*b*, the stored data set DS1 is outputted. Accordingly, the command (83H) received via the input terminal 79*a* can overtake the stored data set DS1 and be transferred from the output terminal 79*b* to the neighboring dot control IC 52. This means that the data transfer system realized by the first functional unit 111 is not a simple FIFO or serial transfer, and is capable of transferring a desired command from the output terminal 79*b* so as to overtake a data set D1 being transferred, without outputting a data set D1 that is being transferred, and without being hindered by the data set D1 that is being transferred.

Accordingly, the second functional unit 112 is capable of transferring the second command (84H) that designates latching via the same transmission system that includes the same input terminal 79*a* and output terminal 79*b* as the data set D1, that is, via the same serial communication circuit 73, the input connectors 61, and the output connector 62. In addition, the second functional unit 112 transfers the second command (84H) to the neighboring dot control IC 52 so as to overtake the first data set D1 stored in the data buffer 121, without being hindered by (obstructed by) the preceding data set D1, and in a state where the data set D1 is stored in the data buffer 121. This means that by supplying the second command (84H) that designates latching at appropriate timing to this system in which a plurality of dot control ICs 52 are serially connected, it is possible to set the desired data sets D1 in the respective dot control ICs 52 as the next data set DN1 to be used to control light emission.

Accordingly, the desired data set D1 for emitting light can arrive at each dot control IC 52 and be latched without appending (recording) identification information, such as network addresses, for specifying the individual dot control ICs 52. This means that it is possible to set a desired first data set D1 in each of a plurality of dot control ICs 52 that are serially connected without separately setting addresses, and to thereby control the dot control ICs 52 individually. As a result, it is possible to separately control the desired LED elements 51 without setting addresses. Here, the expression "without setting addresses" means that it is not necessary to set addresses on the dot control ICs 52 and it is not necessary to include address information in a data set D1 and commands to reach in a desired dot control IC 52. In spite of that, addresses may still be possible to set for the dot control ICs 52 for other purposes.

Figure 17:
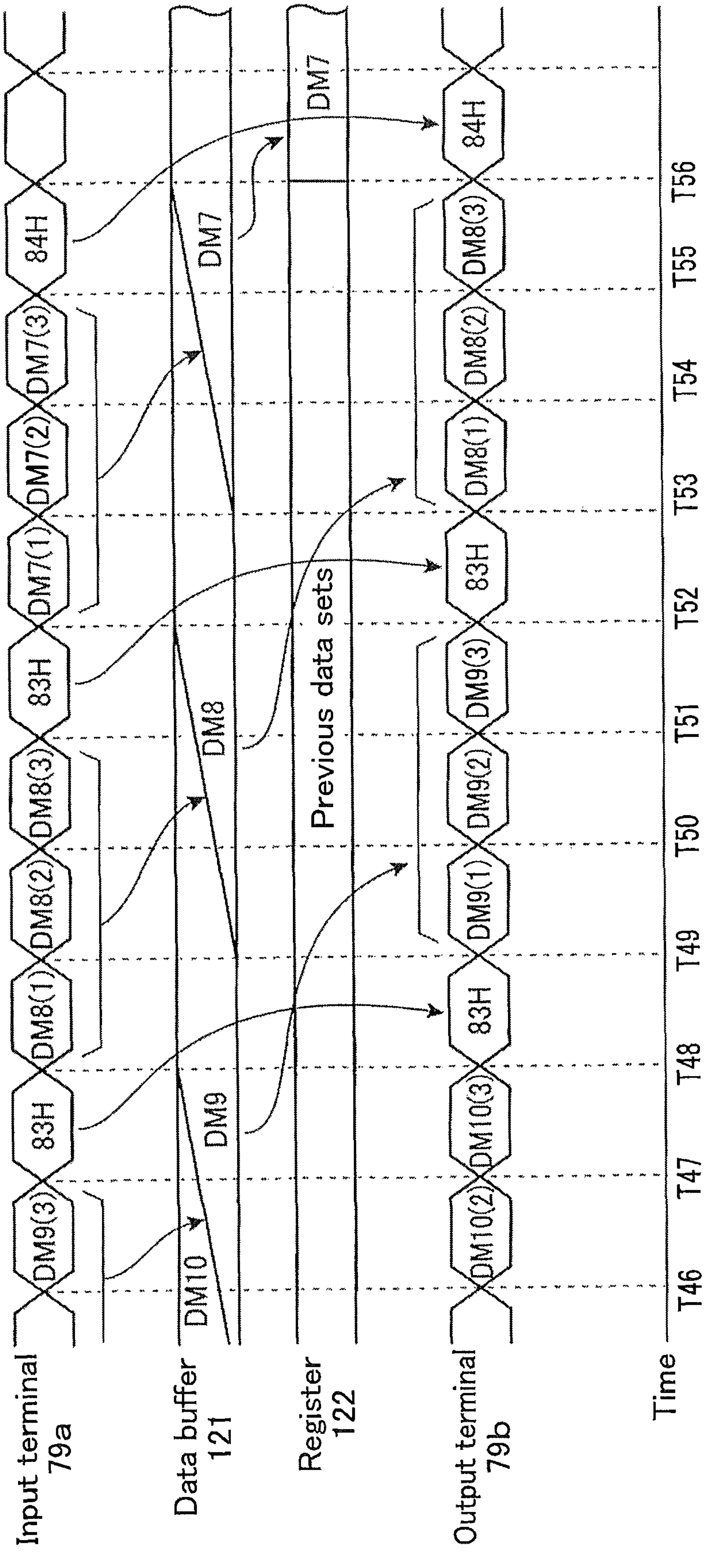
FIG. 17 is a timing chart showing the communication method (communication protocol) of the control unit (dot control IC).
Figure 27:
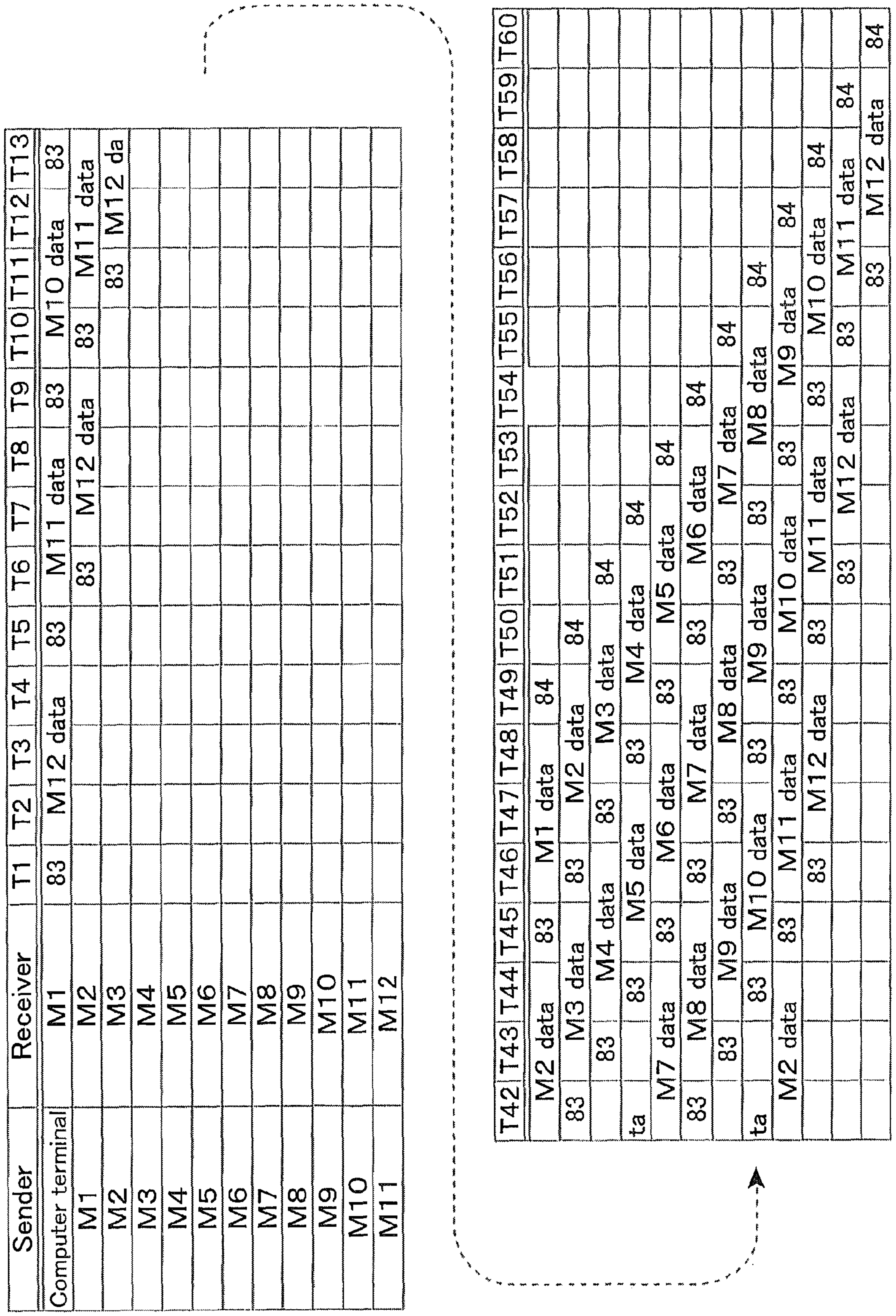
FIG. 27 is a timing chart showing the flow of a communication process during transmission of one display data.

FIG. 17 shows, by means of a timing chart, how a transfer command (83H) and first data sets D1 are transferred by the first function (first functional unit) 111 and how the data sets D1 are latched by the second function (second functional unit) 112. In this example, the system includes twelve dot control ICs 52 (hereinafter, control units M1 to M12) are serially connected and data sets and commands are supplied in order from the control unit M1. In particular, in this drawing, the reception (inputting) and transmission (outputting) of data sets and commands by the seventh control unit M7 of the system is shown. The overall transmission procedure for data sets and commands in this system is shown in FIG. 27.

When the reception unit 81 of the first functional unit 111 of the control unit M7 has received the transfer command (83H) (the first command) from the preceding control unit M6 via the input terminal 79*a* at time T47, the transmission unit 86 outputs the transfer command (83H) to the next control unit M8 via the output terminal 79*b* at time T48. When the data set DM8 for the control unit M8 is received via the input terminal 79*a* at time T48 to T50, the reception unit 81 of the first functional unit 111 of the control unit M7 stores the data set DM8 in the data buffer 121. The transmission unit 86 also outputs the data set DM9 that was stored in the data buffer 121 to the next control unit M8 via the data output terminal 79*b* at time T49 to T51.

In the same way, when the reception unit 81 of the first functional unit 111 of the control unit M7 has received the transfer command (83H) from the control unit M6 via the data input terminal 79*a* at time T51, the transmission unit 86 outputs the transfer command (83H) to the control unit M8 via the output terminal 79*b* at time T52. When the data set DM7 for the control unit M7, that is, its own data set DM7, is received from the control unit M6 via the input terminal 79*a* at time T52 to T54, the reception unit 81 of the first functional unit 111 of the control unit M7 stores the data set DM7 in the data buffer 121. The transmission unit 86 outputs the data set DM8 stored in the data buffer 121 via the output terminal 79*b* at time T53 to T55 to the next control unit M8.

When the reception unit 81 of the second functional unit 112 of the control unit M7 has received the latch command (84H) (the second command) from the control unit M6 via the data input terminal 79*a* at time T55, the transmission unit 86 outputs the latch command (84H) to the control unit M8 via the output terminal 79*b* at time T56. The latch processing unit 82 of the second function 112 of the control unit M7 updates the content of the data register 122 using the data set DM7 stored in the data buffer 121 at time T56. By doing so, the data set DM7 for the control unit M7 becomes valid for illumination control of the LED element 51. Accordingly, when the control unit M7 subsequently receives an illumination command (81H) (the third command), it is possible to illuminate the LED element 51 based on the data set DM7.

The dot control IC 52 also has a third function (third functional unit) 113 including the reception unit 81, the command reception buffer 94, the transmission unit 86, and the on/off control register 87. On receiving, via the first electrical interface, an illumination (light-on) command (81H) (the third command) that designates switching of illumination control of the LED element 51, the third functional unit 113 controls the LED element 51 to become illuminated based on the next data set DN1 set in the data register 122. The third functional unit 113 also outputs the illumination command (81H) via the output terminal 79*b*.

The dot control IC 52 also has a fourth function (fourth functional unit) 114 including the reception unit 81, the command reception buffer 94, the transmission unit 86, the profile generating unit 85, and the profile register 95. On receiving, via the input terminal 79*a*, the connection enquiry command (FEH) (the fourth command) that designates transfer of the profile data (second data set) D2 including information showing the connection relationship of the input connector 61, the fourth functional unit 114 outputs the connection enquiry command (FEH) via the output terminal 79*b*. On receiving data including the data set number D3 following the connection enquiry command (FEH), the fourth functional unit 114 sets the new value produced by adding one to the number included in the data set number D3 in the new data set number D3 and outputs the data set from the output terminal 79*b*. On thereafter receiving one or a plurality of profile data D2 via the input terminal 79*a* corresponding to the number included in the received data set number D3, the fourth functional unit 114 outputs the one or plurality of profile data D2 in order from the output terminal 79*b*. In addition, the fourth functional unit 114 outputs its own profile data D2 stored in the profile register 95 via the output terminal 79*b*.

Light emission control (display control) of the display unit 2 by the computer terminal (display control apparatus) 3 will now be described with the display system 1 shown in FIGS. 18(A) to (C) as an example. FIG. 18(A) is a diagram showing how the assembly blocks 20 are (physically) connected in the display unit 2. FIG. 18(B) is an internal connection diagram showing the electrical connections between the plurality of assembly blocks 20 in such connected state. FIG. 18(C) is a block diagram showing the connection relationship of the signal wires (signal wires for serial communication including the return wire 74) that connect the dot control ICs 52 that are one-to-one correspond to the LED elements 51. The present display unit 2 can also be combined using the assembly blocks 20 that were used in the display unit 2 shown in FIG. 1.

As shown in FIG. 18(A), the display system 1 has a display unit 2 where the assembly blocks 20 are stacked on two levels. The display unit 2 is constructed by combining one single-sized input assembly block 24, five standard blocks (double-sized assembly blocks) 22, and one single-sized end assembly block 25. The display unit 2 is a display panel equipped with a total of twelve dots (dot modules) composed of rows of six dots on two levels. In the display unit 2, the assembly blocks 20 are aligned on two levels in the up-down direction, but none of the assembly blocks 20 is mechanically or electrically connected directly to an assembly block 20 that is adjacent in the horizontal or left-right direction. Instead, the assembly blocks 20 that are adjacent above and below are mechanically connected by the convex skirt 32 and the concave skirt 33 that are the mechanical connection units disposed above and below the respective assembly blocks 20. In addition, the main printed circuit boards 58 enclosed in the assembly blocks 20 located above and below are electrically connected by the female connectors 54 of the output connector 62 and the male connectors 53 of the input connector 61 that are respectively exposed in the center of the convex skirt 32 and the concave skirt 33, resulting in the dot control ICs 52 mounted on the respective main printed circuit boards 58 being connected so as to be capable of serial communication. Also, a power supplying circuit for illuminating the LED elements 51 is generated by connecting the connectors 53 and 54.

In addition, the double-sized standard blocks 22 disposed above and below are aligned so that parts of the housings 30 thereof overlap, and by mechanically and electrically connecting to the standard blocks 22 above and below, it is possible to assemble the display unit 2 that extends in not only the up-down direction but also in the horizontal direction. Due to the mechanical connections, the two single-sized single assembly blocks 24 and 25 and five standard blocks 22 that have been arranged in a matrix are mechanically integrated to form a single display unit 2. Also, the twelve dot control ICs 52 (M1 to M12) that are incorporated in this total of seven assembly blocks 20 are connected so as to be capable of serial communication in a continuous path that zigzags in the up-down direction. A specific example of the mechanical and electrical connections is shown in FIGS. 18(B) and (C).

As shown in FIG. 18(C), a serial communication loop is configured by the serial communication wire (circuit) 73 and the return wire (circuit) 74 of the plurality of assembly blocks 20. The computer terminal 3 and the plurality of dot control ICs 52 carry out serial communication of communication data using the serial communication loop. In this example, the computer terminal 3 that is a control apparatus transmits communication data to the dot control IC 52 (M1) of the single input block 24 that is bottom right in FIG. 18(C). The dot control IC 52 (M1) of the single input block 24 transmits the received communication data to the dot control IC 52 (M2) on the input side of the standard block 22 positioned thereabove. The dot control IC 52 (M12) of the single end block 25 that is bottom left in FIG. 18(C) transmits the received communication data via the return wire 74 of all of the assembly blocks 20 to the computer terminal 3. The communication data sets are successively transmitted from an upstream dot control IC 52 to a downstream dot control IC 52 on a communication path according to serial communication, and are successively transmitted between all of the dot control ICs 52 in FIG. 18(C) in accordance with the connection order of the plurality of dot control ICs 52.

FIG. 19 is a timing chart showing the flow of communication data sets when an initializing process, an extinguishing process, and an illumination process are consecutively carried out. In FIG. 19, T1 to T15 are "timings of communication between the ICs" or "clock cycles" and are referred to as "predetermined time intervals". For example, the top line in FIG. 19 shows communication data sets that the computer terminal 3 transmits to the first dot control IC 52 (M1) via the flat cable 4, and the bottom line in FIG. 19 shows communication data sets that the dot control IC 52 (M12) connected at the end transmits to the computer terminal 3 via the return wire 74 and the flat cable 4.

The computer terminal 3 serially transmits the initialize command code (FFH), extinguish command code (80H), and illumination command code (81H) in order to cause the respective dot control ICs 52 to carry out the three processes described above (timing T1 to T3). In the same way as the transfer command (83H) and the latch command (84H) shown in FIG. 17, these commands are outputted by the third functional unit 113 in each dot control IC 52 from the output terminal 79*b* to the next dot control IC 52 at the next timing after being received via the input terminal 79*a*. In the individual dot control ICs 52, the commands are written in order into the command reception buffer 94, and each dot control IC 52 interprets the command codes written into the command reception buffer 94 and carries out the initializing process, the extinguishing process, and the illumination process in order.

In this example, since the extinguishing process and the illumination process are performed after the initializing process has been carried out, light of the default color set by the initialization will be outputted from each LED element 51. The default color may be white, for example. After the computer terminal 3 has sent the data sets DM1 to DM12 as shown in FIG. 17, it is possible to send the illumination command (81H) after the latch command (84H). The illumination command (81H) is transferred within one cycle delay to the dot control ICs 52 (M1 to M12) in order. Accordingly, the LED elements 51 corresponding to the respective dot control ICs 52 illuminate or change the color and/or intensity in series with a one-cycle delay with the color and/or intensity designated by the data set DM1 to DM12.

The twelve dot control ICs 52 (M1 to M12) that are serially connected repeat the same processes as shown from the third line from the top onwards in FIG. 19. The transfer timing of the communication data sets are delayed by one cycle every time the data passes one dot control IC 52. Accordingly, as shown on the bottom line in FIG. 19, the final dot control IC 52 (M12) receives each command transmitted by the computer terminal 3 and carries out the commands at timing that is delayed by eleven cycles. The commands are returned from the final dot control IC 52 via the return wire 74 to the computer terminal 3 at timing that is delayed by 12 cycles, and from the returned commands, the computer terminal 3 may confirm that the commands properly reached the final dot control IC 52. Typically, when N dot control ICs 52 are connected (where N is a natural number), the Nth dot control IC 52 receives the command with a delay of (N−1) cycles and transmits the command to the return wire 74 with a delay of N cycles. Accordingly, the computer terminal 3 will receive the communication data set, which the computer terminal 3 itself transmitted, with a delay of N cycles.

FIG. 20 is a timing chart showing the flow of communication data sets when the computer terminal 3 has transmitted the connection state enquiry command code (FEH). As shown in FIG. 15, the computer terminal 3 serially transmits two communication data sets including the connection state enquiry command code (FEH) and the number data D3 (which is initially set at "00") to the first dot control IC 52 (M1) (timings T1, T2).

The fourth functional unit 114 of the first dot control IC 52 (M1) receives the communication data sets serially via the reception unit 81, and writes the communication data sets in order into the command reception buffer 94. When the connection state enquiry command code (FEH) has been stored in the command reception buffer 94, the profile generating unit 85 generates its own profile data and stores the profile data in the profile register 95. The first dot control IC 52 (M1) is a single input block 24. The profile generating unit 85 generates "10H" and stores "10H" in the profile register 95.

The fourth functional unit 114 of the dot control IC 52 (M1) transmits the connection state enquiry command code (FEH) stored in the command reception buffer 94 using the transmission unit 86, transmits the number data "01" produced by incrementing the number data D3 stored in the command reception buffer 94 by one, and also reads and transmits its own profile data stored in the profile register 95. Accordingly, the first dot control IC 52 (M1) serially transmits three communication data (at timing T2 to T4).

Figure 18:
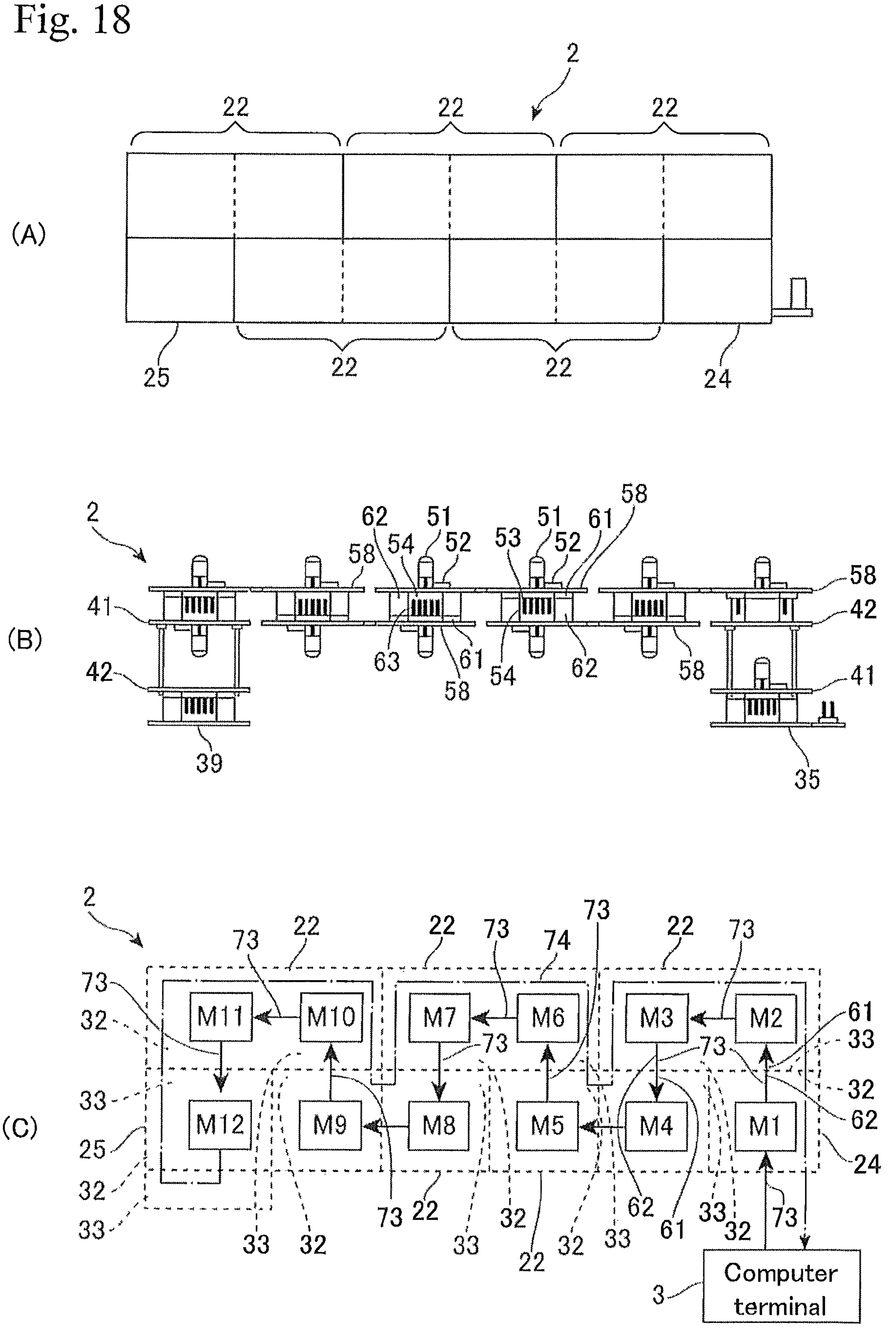
FIG. 18(A) shows a different example of a display unit produced by assembling assembly blocks.
FIG. 18(B) shows electrical connections thereof.
FIG. 18(C) shows a transfer path serial communication loop of data.

The fourth functional unit 114 of the twelve dot control ICs 52 (M1 to M12) in FIG. 18 repeat the same processing on receiving the connection state enquiry command code (FEH). The transfer timing of the communication data is delayed by one cycle every time the data passes one dot control IC 52. Also, every time the data passes one dot control IC 52, new profile data is added to the end of the transferring communication data sets.

The final dot control IC 52 (M12) receives the connection state enquiry command code (FEH) transmitted by the computer terminal 3 with an eleven-cycle delay, and can transmit directly to the computer terminal 3 via the return wire 74 with a delay of twelve cycles and without passing the other dot control ICs 52. The number data D3 outputted by the dot control IC 52 (M12) is "12" and shows that twelve profile data PM1 to PM12 follow thereafter (timing T13 to T26).

Figure 21:
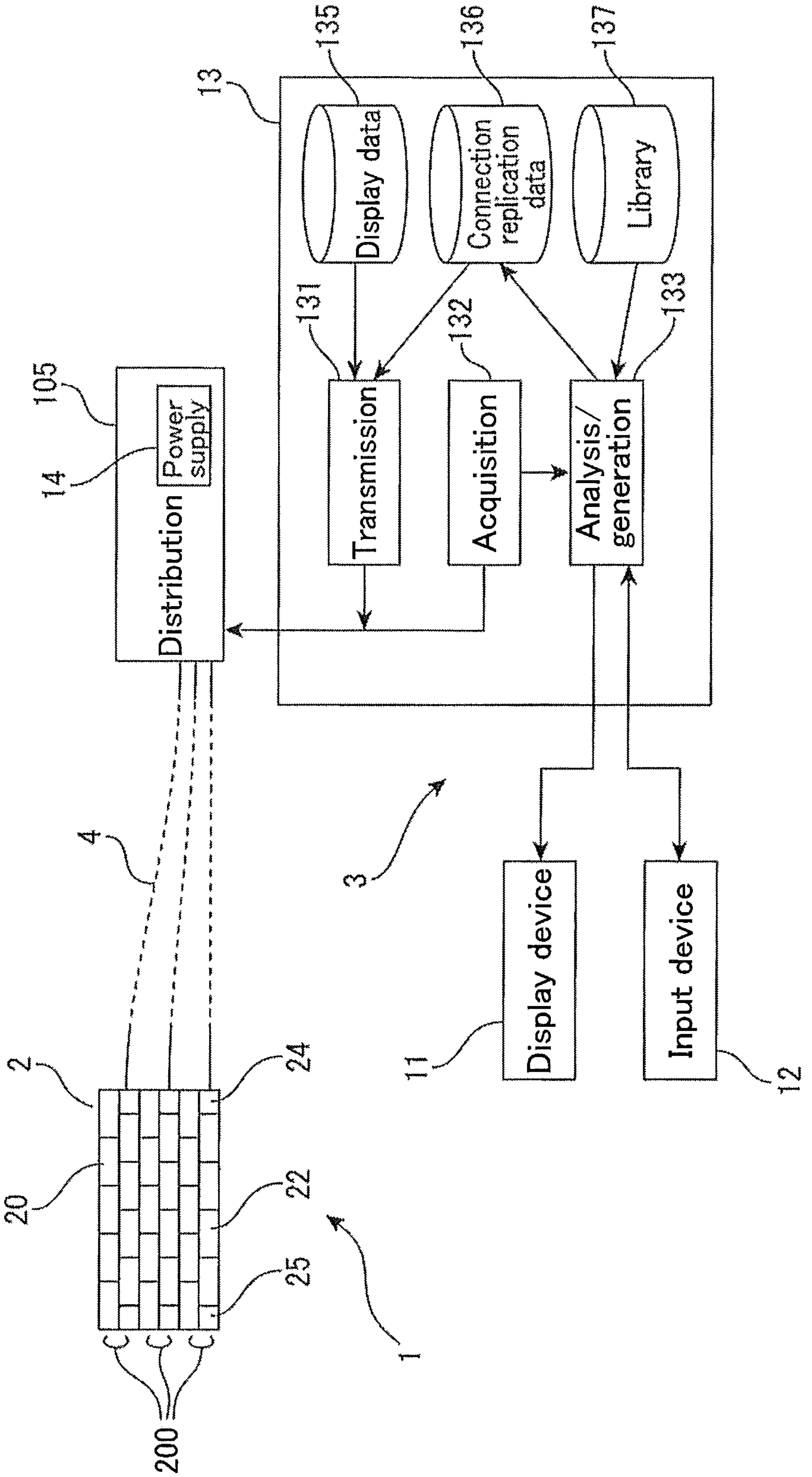
FIG. 21 is a block diagram showing functional units of the display control apparatus.

FIG. 21 shows the display apparatus (display system) 1 focusing on the control system. The display unit 2 shown here is produced by assembling of three light emitting groups 200, the three light emitting groups 200 being stacked to make multi levels (layers), in this case 3×2 levels, and each emitting group 200 including a plurality of assembly blocks 20 having been stacked on two levels as in the display unit shown in FIG. 18. One light emitting group 200 includes nine double-sized standard blocks 22, one single input block 24, and one single end block 25, and can display 210 pixels. Accordingly, the display unit 2 can display 610 pixels. The individual light emitting groups 200 are connected to a distribution unit 105 by individual cables 4, and are collectively managed by a display control apparatus 3 via the distribution unit 105.

The display control apparatus 3 is realized by a computer terminal, and the functions as a display control apparatus are realized by a computer main unit 13, for example a personal computer, executing an installed program 13P.

The control apparatus 3 has a function (transmission unit, functional unit of transmitting, transmission means) 131 that transmits the first data set D1, the transfer command (83H) that is the first command, and the latch command (84H) that is the second command, to the assembly block (input block) 24 that constructs one end of a light emitting group 200. The control apparatus 3 includes a function (reception unit, functional unit of acquiring, acquiring means) 132 that acquires information (profile data) D2 showing the connection relationship from the plurality of light emitting groups 200 and a function (generator, functional unit of generating, generating means) 133 that analyzes the profile data D2 based on a library 137 and generates connection replication data (connection reproduction data) that show the connection state of a plurality of assembly blocks. The functional unit of transmitting 131 reorganizes display data 135 based on the connection replication data 136 and transmits the reorganized (reordered) first data sets D1 that respectively correspond to assembly blocks 20 included in the respective light emitting groups 200 to the respective light emitting groups 200. In addition, the functional unit of transmitting 131 includes a function that transmits other commands, such as the illumination command.

In this example, the acquisition function 132 transmits the connection state enquiry command code (FEH), which is the fourth command that requests the profile data D2, via the transmission function 131 to the respective light emitting groups 200. After this, the profile data D2 of the respective assembly blocks 20 included in the respective light emitting groups 200 is received in order of the assembly blocks 20 included in the respective light emitting groups 200 following the command (FEH) and the number data D3. The generating function 133 analyzes the types, connection orientations, and the like of the assembly blocks 20 in accordance with the order in which the profile data D2 was received and generates the connection replication data 136. The transmission function 131 reorders the plurality of first data sets D1 for display on the display unit 2 based on the connection replication data 136 and transmits the first data sets D1 to the respective light emitting groups 200.

Figure 22:
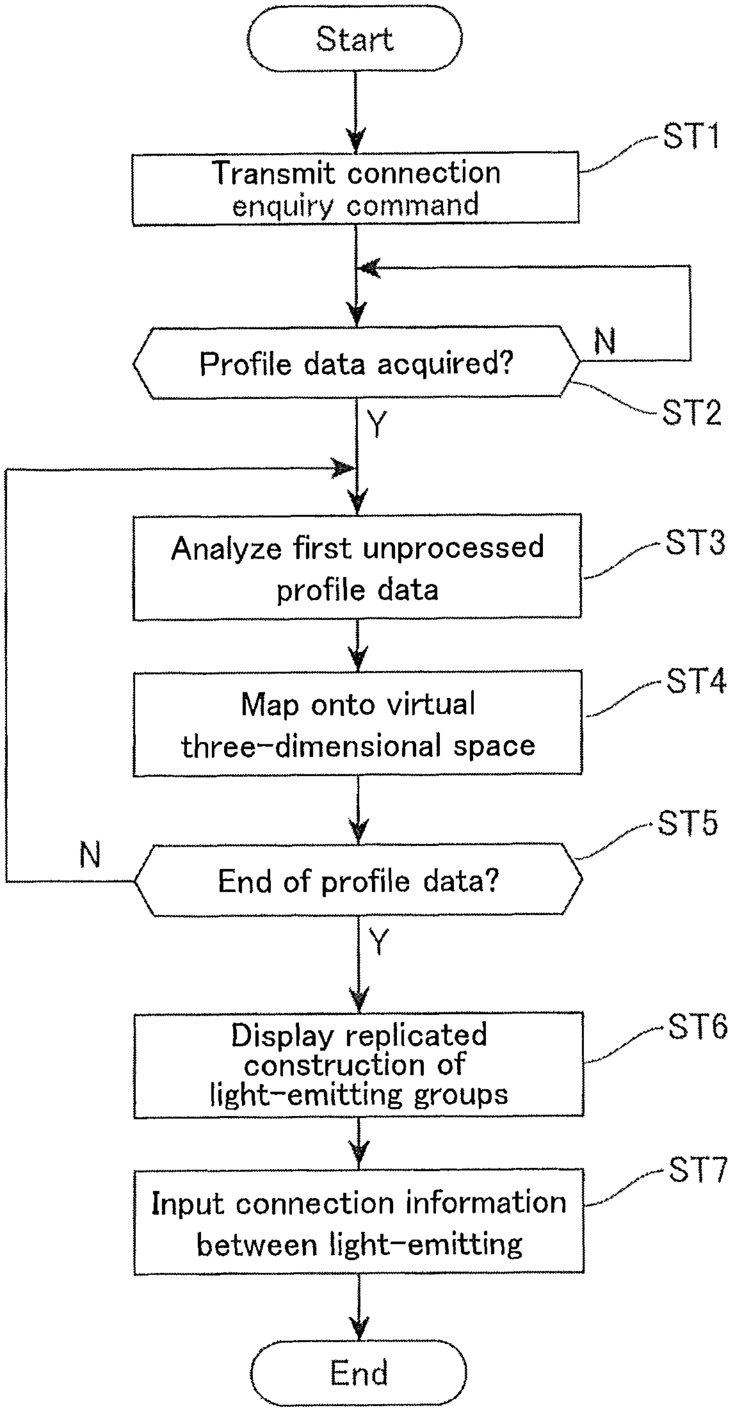
FIG. 22 is a flowchart showing the flow of a process for replicating three-dimensional shape of a display unit by a functional unit of acquiring and a functional unit of generating of the display control apparatus.

FIG. 22 shows, by way of a flowchart, the flow of the processing whereby the display control unit, which uses a computer terminal 3, reproduces the three-dimensional shape of the display unit 2. The acquisition function (functional unit of acquiring) 132 of the control apparatus 3 first transmits the connection state enquiry command code (FEH), which requests the connection relationships of the respective assembly blocks 20, and the number data D3, and starts an acquisition process (step ST1). After a predetermined delay, the transmitted connection state enquiry command code (FEH) and the profile data sets D2 of the dot control ICs 52 of all of the assembly blocks 20 that are connected are received (step ST2). The generating function (functional unit of generating) 133 of the display control apparatus 3 starts an analyzing process according to a condition where a plurality of assembly blocks 20 are connected in the order in which the profile data sets D2, which show the connection relationships of the plurality of assembly blocks 20, are received. The generating function 133 acquires the first unprocessed profile data out of the received profile data (step ST3). The computer terminal 3 maps a dot control IC 52 (an assembly block 20) onto a position shown by the profile data in a virtual three-dimensional space (step ST4).

In the first process carried out immediately after reception, the generating function 133 acquires the first profile data set out of the received profile data sets and maps a dot control IC 52 corresponding to the first profile data set onto the origin in the virtual three-dimensional space. Until the profile data sets D2 ends (step ST5), the generating function 133 repeats processing that fetches the next profile data set (step ST3), analyzes the next profile data set, and maps a dot control IC 52 onto the specified position (step ST4).

For the example of twelve profile data sets D2 acquired as shown in FIG. 20, the generating function 133 refers to the library 137 including the types, connection data, and the like of the assembly blocks 20 and determines from the first profile data set "10" that the assembly block 20 including the first dot control IC 52 is a single block 21. The generating function 133 maps the first dot control IC 52 onto the origin of the virtual three-dimensional space. From the second profile data set "00", the generating function 33 determines that the second dot control IC 52 is the input side of a standard block 22. In this case, the computer terminal 3 maps the second dot control IC 52 onto a position that is shifted by one in one axial direction in the virtual three-dimensional space (for example, in the positive direction on the Y axis for a case where the X axis is horizontal and the Y axis is vertical).

The generating function 133 determines from the third profile data set "78" that the third dot control IC 52 is the output side of a standard block 22. In this case, the generating function 133 determines from the second profile data "00" and the third profile data set "78" that the dot control ICs 52 are the input and output sides of a single standard block 22, and maps the third dot control IC 52 onto a position that is shifted by one in a direction that is perpendicular to a straight line that joins the first and second dot control ICs 52 (for example, in the positive direction on the X axis).

From the fourth profile data set "00", the generating function 133 determines that the fourth dot control IC 52 is the input side of a standard block 22. From the analyzing process carried out on the profile data up to the third profile data set, it is possible to judge that the standard block 22 is a next standard block 22 that is connected to the preceding standard block 22. The generating function 133 maps the fourth dot control IC 52 onto a position that is shifted by one in the negative direction on the Y axis in the virtual three-dimensional space.

On the other hand, if it has been determined by the analysis process of the profile data up to the third profile data set that the preceding block is a diagonal-rising block 23 and that the next standard block 22 is connected thereto, the generating function 133 maps the fourth dot control IC 52 onto a position that is shifted by one in the opposite direction to the case above, that is, the positive direction on the Y axis in the virtual three-dimensional space. Since the connection orientation of the next standard block 22 with the preceding standard block 22 will be 90° when the fourth profile data set is "01", the generating function 133 maps the fourth dot control IC 52 onto a position that is shifted by one in the negative direction on the Y axis in the virtual three-dimensional space and sets the orientation of the next dot control IC 52 at a position shifted by one in the positive direction on the Z axis. This is the same as when other connection orientations are included in the profile data.

By repeating this type of process, the generating function 133 maps dot control ICs 52 corresponding to all of the profile data onto a virtual three-dimensional space. When the analyzing process ends for all of the profile data sets D2 that has been received, the generating function 133 records the connection replication data 136 onto a suitable recording medium, such as a flash memory or HDD, included in the computer resources. In addition, the generating function 133 displays the construction of the display unit 2 in three dimensions based on the connection replication data 136 in units of the light emitting groups 200 on the display device 11, for example, a liquid-crystal display (step ST6). From the three-dimensional object displayed on the display device 11 according to the connection replication data 136, the user can visually confirm the state of the mechanical connections and the state of the electrical connections of the assembly blocks 20 based on data that has been automatically acquired. In addition, the generating function 133 includes a function (step ST7) that manually inputs the connection relationship between the plurality of light emitting groups 200. The configuration of the plurality of assembly blocks 20 that are electrically connected to one another can be automatically analyzed by acquiring the profile data D2. However, a display unit 2 including a plurality of light emitting groups 200 such as the display unit 2 shown in FIG. 21 will include connection relationships where elements are connected mechanically but are not connected electrically. For example, although the plurality of light emitting groups 200 that are stacked in the up-down direction are mechanically connected to one another, such groups are not electrically connected. Accordingly, by manually inputting mechanical connections of this type, the user can further improve the accuracy of the connection replication data 136.

Figures 23, 24:
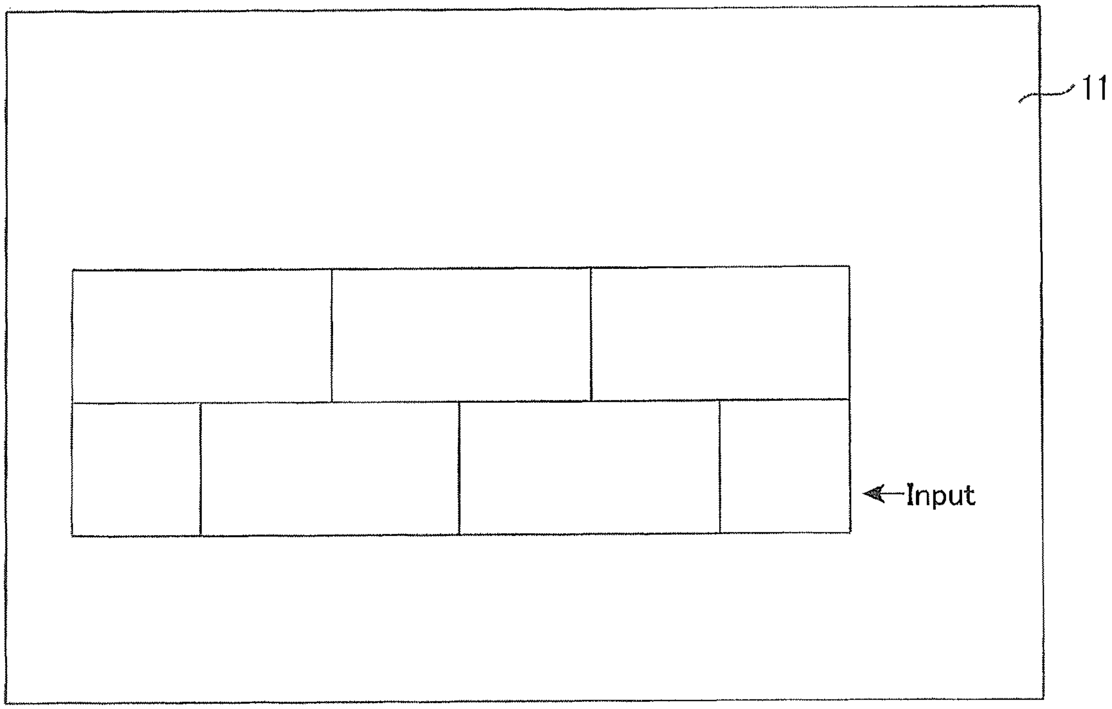
FIG. 23 is a diagram showing an example of a result of mapping, onto a virtual three-dimensional space, a dot display (a configuration of assembly blocks) of a display unit produced by assembling the assembly blocks.
FIG. 24 is an example display that reproduces the construction of a display unit.

FIG. 23 shows the result of mapping twelve dot control ICs 52 onto a virtual three-dimensional space based on the twelve profile data set D2 shown in FIG. 20. According to the analyzing/generating process of the profile data sets D2 described above, the control apparatus 3 that uses a computer terminal can obtain a mapping result that matches the actual connection relationship of the twelve dot control ICs 52 in FIG. 18(C).

The transmission function 131 uses the layout of the plurality of dot control ICs 52 specified by the connection replication data 136 showing the mapping result to edit polygon data (display data) 135 corresponding to the external forms of the assembly blocks 20 in FIG. 2 or FIG. 3 and transmits the edited data as a display data set D1 to the light emitting group 200.

FIG. 24 is an example of a display screen of a replication image of the display unit 2. The replication image of the display unit 2 shown in FIG. 24 is a construction reproduced based on the profile data sets D2 in FIG. 20, and can be displayed on the display device 11. The display unit 2 in the replication image shown in FIG. 24 has a shape where rows of six assembly blocks 20 are stacked on two levels, where single blocks 21 are disposed at both left and right ends on the first level and standard blocks 22 are disposed at the remaining parts. The characters "←INPUT" in FIG. 24 show input of the communication data and mean that communication data is inputted from the single block 21 at the bottom right end. This corresponds to the connected structure of the assembly blocks 20 of the display unit 2 shown in FIGS. 18(A) to (C).

Figure 25:
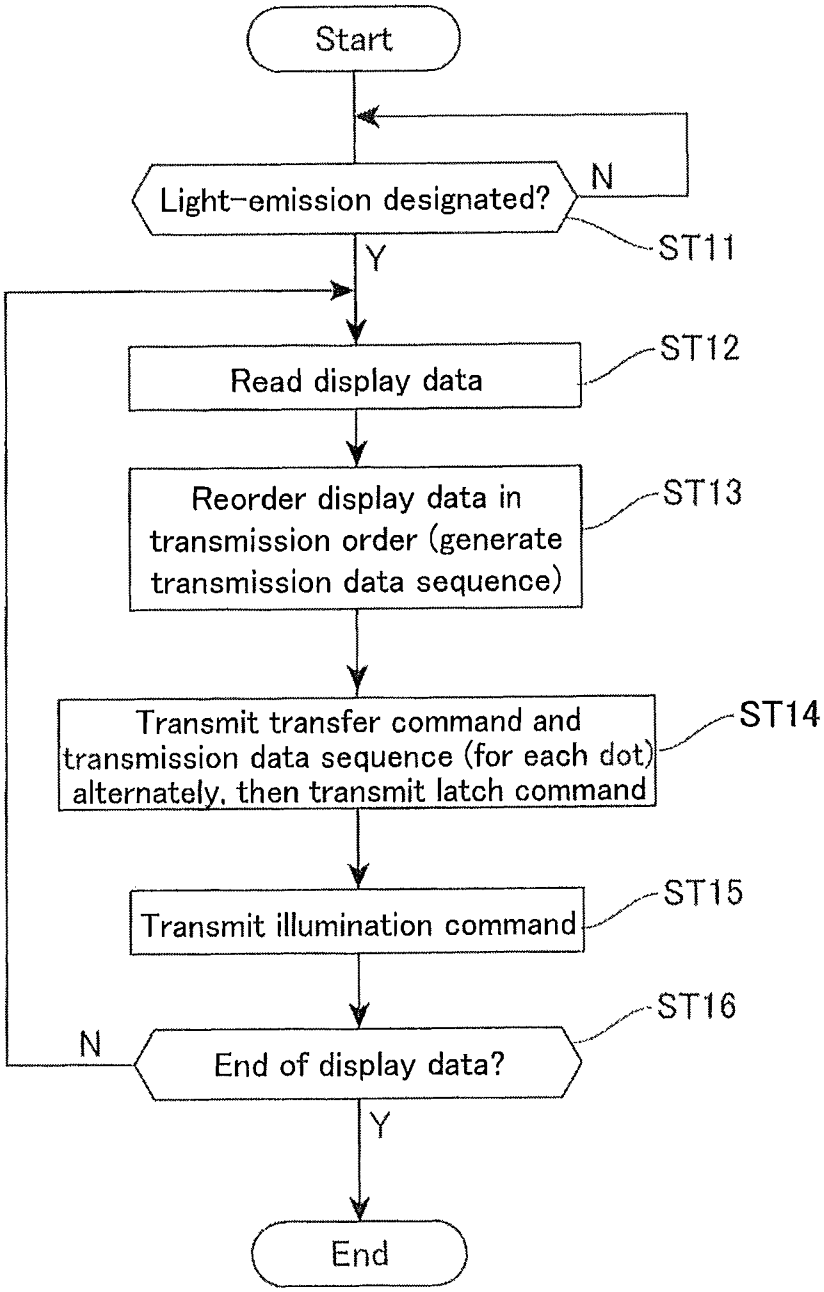
FIG. 25 is a flowchart showing the flow of a process whereby the display of the display unit is controlled by a functional unit of transmitting of the display control apparatus.

FIG. 25 shows, by way of a flowchart, the processing whereby the display control apparatus 3 that uses a computer terminal controls the display (light emission) of the display unit 2. This process (control) is carried out by consecutively carrying out the process that obtains the profile data sets D2 and the process that generates the connection replication data 136 shown in FIG. 22. That is the obtaining the profile data sets D2 and generating the connection replication data 136 shown in FIG. 22 are carried out as an initializing when the display unit 2 and the display control apparatus 3 are connected, with the processing shown in FIG. 25 (transmitting display data sets and commands) being carried out thereafter.

When there is a light emission designation from the input device 12 (step ST11), the transmission function (functional unit of transmitting) 131 of the computer terminal 3 reads the display data 135 for one display cycle on the display unit 2 from a memory or the like (step ST12). Such display data 135 includes color data for each bit module that has been generated based on a coloration process carried out for each bit module in the replication image in FIG. 24, for example. The color data may be composed of red luminance data, green luminance data, and blue luminance data. The light emission designation is generated by the input device 12 or the like when emission of light by the display unit 2 is to start and when the light emission color of the display unit 2 is to change, for example.

The transmission function 131 that has read the display data 135 used in one display cycle (display of one frame) on the display unit 2 reorders the display data 135 to generate the reordered transmission data according to the sequence of the connection order of the dot control ICs 52 for designating emission of light (step ST13). As described, the plurality of dot control ICs 52 are not electrically and mechanically connected in a horizontal line or lines in the display unit 2 in FIG. 18(A) or FIG. 23. Even if the assembly blocks 20 are aligned (arranged) in a horizontal line in FIG. 18(A) and FIG. 23, the assembly blocks 20 are not electrically connected in such arrangement. The transmission function 131 reorders the color data (luminance data) sets D1 of each bit module so that the display data sets 135 for one display cycle matches the order from the display data set for the dot control IC 52 (here, M12) that is connected at the far end to the display data set for the dot control IC 52 (here, M1) that is connected at the front.

Figure 26:
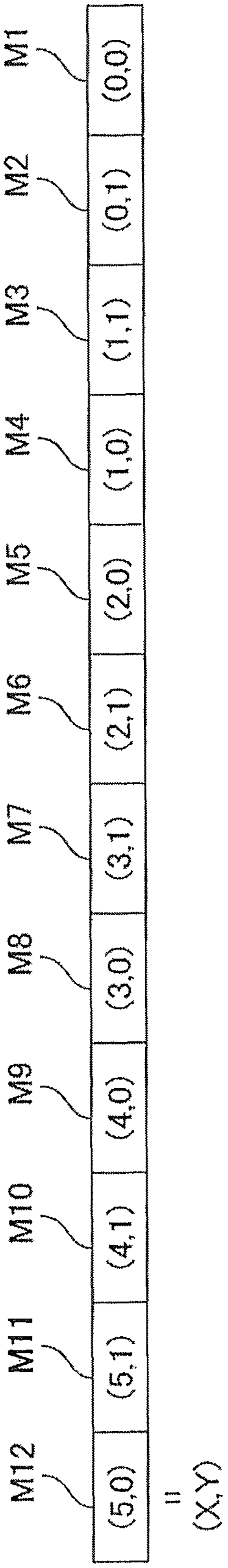
FIG. 26 is a diagram showing one example of a transmission data sequence generated by realigning display data.

FIG. 26 shows an example of the transmission data sequence after the reordering process. In FIG. 26, each cell corresponds to color data (luminance data) set for each bit module (dot control IC 52). Also, the number inside each cell shows the (X, Y) coordinate values of the mapping result in FIG. 23. As shown in FIG. 26, the transmission function 131 generates a transmission data sequence that has the color data (luminance data) sets for the dot control IC 52 (here, M12) at the end first (at the front or first on the time axis) to the dot control IC 52 (here, M1) at the front at the end (i.e., last on the time axis) respectively.

After the transmission data sequence including the reordered color data sets for each dot in the order of the plurality of dot control ICs 52 in the serial communication loop has been generated, the transmission function 131 alternately transmits the transfer command (83H) and the color data sets D1 in the transmission data sequence in dot units and finally transmits the latch process command code (84H) (step ST14). As shown in FIGS. 14 and 17, in the dot control ICs 52 that are serially connected, the first functional unit 111 buffers the received color data set D1 and transmits, after the transfer command (83H), the preceding color data set DS1 that was buffered. Next, when the latch command (84H) has been received following the transmission data sequence, the second functional unit 112 of the dot control IC 52 sets the buffered preceding color data set DS1 as the next color data set DN1 of the LED element 51 without transmitting the data set and transfers only the latch command (84H). By doing so, the latch command (84H) overtakes the color data set D1 and circulates on the serial communication circuit (without the color data set D1 being transferred). Accordingly, the dot control ICs 52 that are connected in order by the serial communication circuit respectively latch the color data sets D1 that have been ordered in the transmission data sequence so as to correspond to the order of the dot control ICs 52. In addition, when the transmission function 131 has transmitted the illumination command (81H) (step ST15), the third functional unit 113 of the dot control IC 52 illuminates the LED element 51 based on the latched color data set D1. The latch command (84H) may also serve as the illumination command, and in such case, it is possible to change the illumination (light emitting) state of the LED element 51 in the cycle after the latch command (84H) is received. By splitting the latch command and the illumination command, it is possible to change the time at which the data sets D1 are transferred and the time at which the LED elements 51 are illuminated based on the data sets D1.

In step ST16, the processing described above is repeated until the sequenced of the display data 135 to be displayed on the display unit 2 has ended. As a result, it is possible to display a variety of images including moving images and still images on the display unit 2 that has been assembled from a plurality of assembly blocks 20.

FIG. 27 is a timing chart showing the flow of a communication process carried out by the computer terminal (display control apparatus) 3 and the plurality of dot control ICs 52 to transmit display data sets of one display cycle. During this transmission process of display data sets, the transmission function 131 of the display control apparatus 3 first transmits the data transfer command code (83H) (timing T1), and then transmits the first group of color data sets D1 in the transmission data sequence (the luminance data for the dot control IC 52 (M12)) (timing T2 to T4). The transmission function (functional unit of transmitting) 131 repeats the same process for each color data set (which includes luminance data) in the transmission data sequence in dot units and transmits the color data set D1 of every dot unit (that is, each dot control IC 52) in the transmission data sequence appended with the data transfer command code (83H) (timing T1 to T48). After this, the transmission function 131 transmits the latch command code (84H) (timing T49).

The timing chart in FIG. 27, three cycles are used to transmit the color data set D1 of each dot module (note that the transmission process of one communication data by serial communication is referred to here as "one cycle") since each color data set D1 of each dot control IC 52 includes three luminance data composed of red luminance data, green luminance data, and blue luminance data as the color data, and in this example, transfer of the respective luminance data requires one cycle.

The plurality of communication data sets transmitted from timing T1 to timing T49 by the transmission function 131 of the display control apparatus 3 are received in this order by the first dot control IC 52 (M1). On receiving a new data transfer command "83H", the transmission unit 86 of the first dot control IC 52 (M1) transmits the data transfer command "83H" and serially transmits one group of luminance data sets (data set DS1) stored in the reception buffers 89, 91, 93 to the next dot control IC 52 (M2) (the first function 111). That is, the first dot control IC 52 (M1) transmits the color data sets to be used by all of the dot control ICs 52 (M2 to 12) that are connected downstream of the dot control IC 52 (M1) in the direction of the connections to the next dot control IC 52 (M2) (timing T6 to T49). After this, since the latch command (84H) is received in place of the transfer command (83H), the transmission unit 86 of the first dot control IC 52 (M1) transmits the latch command code (84H) received from the display control apparatus 3 without transmitting its own color data set (data for M1) that was received last (timing T50) (the second function 112). Accordingly, the latch command (84H) can be transferred to the next dot control IC 52 (M2) using the same serial communication loop without being hindered by the data set for M1, which makes it possible for the next dot control IC 52 (M2) to latch its own (M2) data set.

In the same way as the first dot control IC 52 (M1), on receiving a new data transfer command "83H", the eleven dot control ICs 52 (M2 to 12) that are connected serially after the first dot control IC 52 (M1) each transmit a luminance data set (DS1) that was stored in the data buffer 121 to the next dot control IC 52 (timing T11 to T59) (first functional unit 111). Also, when the latch command code (84H) is received, the latch command code (84H) is transmitted to the next dot control IC 52 (M3 to 12) (timing T51 to T60) (second functional unit 112). When the latch command code (84H) is received, each dot control IC 52 writes (latches) the luminance data stored in the respective luminance data reception buffers 89, 91, 93 into the respective luminance data registers 88, 90, 92. When the values of the luminance data registers 88, 90, 92 have changed, the respective PWM signal generating units 83 generate PWM signals in accordance with the values after such change.

After this, when the illumination command (81H) is received, the light emission colors of the LED elements 51 whose emission of light is controlled by the third functional unit 113 of the respective dot control ICs 52 are individually changed. The colors emitted by the respective dot modules (cubes) change in accordance with the changes in the light emission colors of the respective LED elements 51.

As described above, the display system 1 has the assembly blocks 20 that are connected together to physically form the display unit 2 and automatically become electrically connected in series, and the computer terminal (display control apparatus) 3 that is connected to the display unit 2 and transmits the command codes used in the assembly blocks 20 to control the emission of light. The display unit 2 is capable of emitting light and displaying images, and has a freely chosen shape produced by combining the plurality of assembly blocks 20. Also, by carrying out a simple manual operation of physically connecting the plurality of assembly blocks 20, it is possible to produce and disassemble a light emitter of the desired shape. It is simple to change the shape of or relocate a panel or objet produced by the display unit 2.

The display control apparatus 3 generates the connection replication data 136 based on the profile data sets D2 showing the plurality of connection relationships acquired from the plurality of assembly blocks 20 and, by carrying out communication control based on the connection replication data 136, transmits command codes for individually controlling the respective assembly blocks 20 to the plurality of assembly blocks 20. Accordingly, when a large display unit 2 or a complex display unit 2 has been formed using a plurality of assembly blocks 20, it is possible for the display control apparatus 3 to control the emission of light by each of the assembly blocks 20 independently of the emission of light by the other assembly blocks 20. That is, a light-emitting apparatus (display unit) 2 such as the one to be installed in an exhibition space can be constructed using a plurality of assembly blocks 20 that emit light, and it is possible to favorably control the emission of light by the respective assembly blocks 20 without confusion regarding the electrical connections between the plurality of assembly blocks 20.

A typical example of profile data set D2 showing the connection relationship includes shape setting bits showing the type and the like of a present assembly block 20 and orientation detection bits showing the connection orientations of other assembly blocks 20. Based on such information, the generating function (functional unit of generating) 133 of the computer terminal 3 is capable of generating the connection replication data 136.

Each assembly block 20 has a control unit (dot control IC 52) for controlling emission of light by the assembly block 20, and by connecting a plurality of assembly blocks 20, a plurality of dot control ICs 52 will construct a serial communication loop that sends and receives data sets and command codes in order. It is also possible to communicate the data sets and command codes using this serial communication loop. By transmitting the command codes and data sets to one dot control IC 52 at the input end, the display control apparatus 3 can transfer the command codes and data sets to the control units 52 of all of the connected assembly blocks 20 using the serial communication loop. The display control apparatus 3 is also capable of receiving a command code via the return wire 74, and the display control apparatus 3 can know that the command code has been transmitted to the control units 52 of all of the assembly blocks 20. Accordingly, the display control apparatus 3 can know that communication has been carried out even if the dot control ICs 52 of the respective assembly blocks 20 do not reply to the display control apparatus 3 to show that the command codes have been received. There is fundamentally no limit on the number of assembly blocks 20 that can be connected. However, since one cycle is consumed to transfer a command code, the number of assembly blocks that are electrically connected should preferably be in a range where deterioration in the image display due to such delays does not become prominent.

The display control apparatus 3 transmits a command code that requests the connection relationships of the respective assembly blocks 20. Each control unit (dot control IC) 52 transmits a profile data set D2 showing its own connection relationship so as to follow the received command code and the received one or plurality of profile data sets D2 showing the connection relationships of the assembly blocks 20 that have been generated by other control units 52. The display control apparatus 3 acquires the plurality of profile data sets D2 via the return wire 74 and generates the connection replication data 136 according to a condition whereby the plurality of assembly blocks 20 are connected in the order in which the plurality of profile data sets D2 have been received. By favorably using the fact that the plurality of dot control ICs 52 are serially connected and using the profile data sets D2 showing the connection relationships of the respective assembly blocks 20, it is possible to generate the connection replication data 136 showing the connected state of the plurality of assembly blocks 20 in the display unit 2.

Based on the connection replication data 136, the display control apparatus 3 reorders the color data sets D1 designating the respective display colors of the plurality of assembly blocks 20 into the order of the plurality of control unit ICs 52 in the serial communication loop and then transmits the color data sets D1. Accordingly, the plurality of assembly blocks 20 that construct the display unit 2 can emit light of the respective designated colors. After transmitting color data to all of the assembly blocks 20, the display control apparatus 3 transmits the latch command code. Based on the reception of the latch command code, the control units 52 change the respective display colors to the colors designated by the color data. Accordingly, the latch command code is transferred within the command communication loop, and by doing so, the plurality of control units can switch their display colors at substantially the same time. In one display unit 2, the display colors of the plurality of assembly blocks 20 can be switched at substantially the same time according to the transfer timing of the latch command code. Using a plurality of connected assembly blocks 20 assembling the display unit, it is possible to show various patterns of emitting lights that are not limited to the patterns that flows the colors in one direction according to the serial communication loop.

As described above, the display control apparatus 3 equipped with these functions can be realized by executing the program 13P using a general-purpose computer apparatus. The program (program product) 13P can be provided by being recorded on a suitable recording medium such as a CD-ROM or a memory. The program 13P may also be provided using a computer network such as the Internet.

In the embodiment described above, the input connector 61 of the respective assembly blocks 20 is the four male connectors 53 and the output connector 62 is the two female connectors 54. The correspondence between such elements may be reversed. As an alternative example, the input connector 61 and the output connector 62 may use common connectors where for example a plurality of pins or a plurality of pin insertion holes are arranged in a square. In this modification, the common connectors may be disposed so that the centers thereof match the centers of the housings 30.

Figure 28:
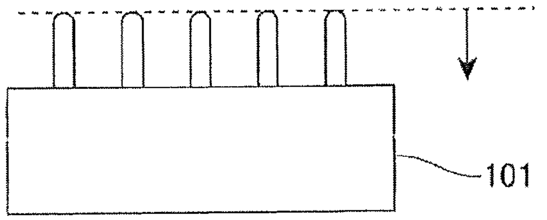
FIG. 28 is a diagram showing an example modification of a connector (clamp-type connector).

FIG. 28 shows a press-fastener type male connector 101 that has ten extendable (telescopic) pins. The ten pins are arranged in two rows. By using only one press-fastener type connector 101, it is possible to construct the input connector 61 and the output connector 62. The respective pins of the connectors 101 extend and retract (i.e., shorten) in the direction of the arrow in FIG. 28.

Figure 29:
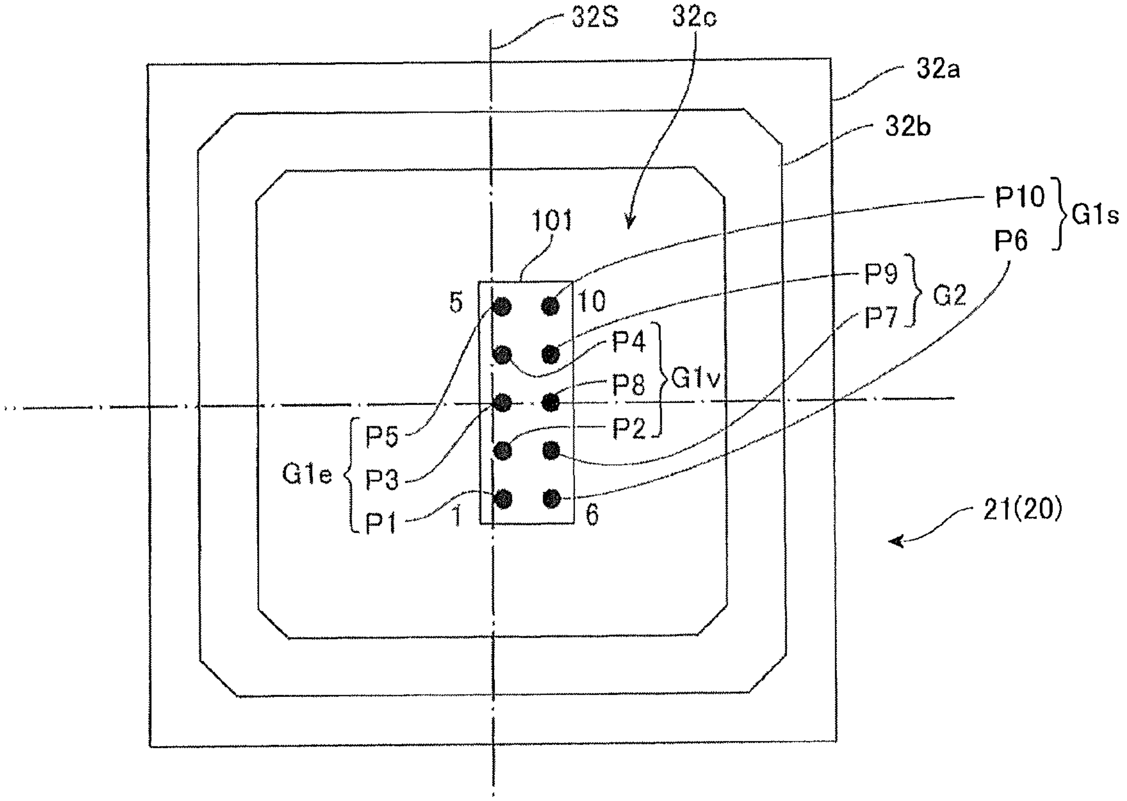
FIG. 29 is a diagram showing a different arrangement of male connectors (external type connectors).
Figure 30:
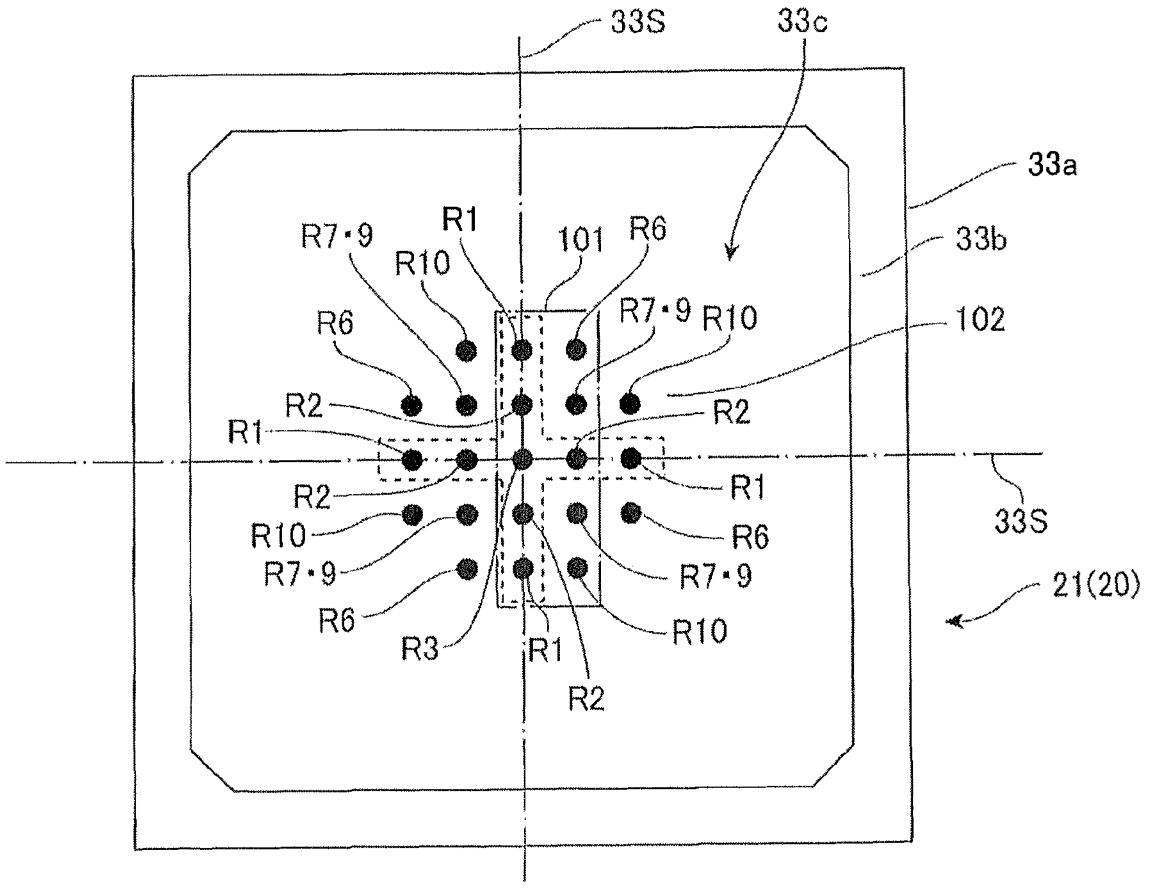
FIG. 30 is a diagram showing a different arrangement of female connectors (internal type connectors).

FIG. 29 and FIG. 30 show electrical connectors in other layouts. FIG. 29 shows a male connector (external connector) 101 where ten pins P1 to P10 are arranged in two rows in a length direction. FIG. 30 shows a female connector (internal connector) 102 that is equipped with twenty-one pads. One row including the pins P1 to P5 on the male connector 101 is disposed so as to coincide with a center line 32S of the convex skirt 32 that is the mechanical connection unit. Accordingly, when the orientation of the convex skirt 32 changes, the positional relationship between the other row that includes the pins P6 to P10 and the center line 32*s* will change.

The male connector 101 includes a first terminal group G1 that is arranged so that the electrical connections do not change according to the connection orientation of the female connector 102 and a second terminal group G2 whose electrical connections change according to the connection orientation. The first terminal group G1 includes pins P1 to P6, P8, and P10, and the second terminal group G2 includes pins P7 and P9. The first terminal group G1 includes a terminal group G1*v* that is connected to the VCC wire 72 as a power supply circuit, a terminal group G1*e* that is connected to the ground wire 71, and a terminal group G1*s* that is connected to the signal wires. The terminal group G1*e* includes pins P1; P3, and P5 that are disposed in the longitudinal (length) direction of the male connector 101 along the center line 32S. The terminal group G1*vs* include pin P2 and P4 that are disposed in the longitudinal direction of the male connector 101 along a center line 32*s* and the pin P8 that is disposed along a perpendicular center line 32*s*. Since these terminals (pins) are disposed so as to be spread out in the longitudinal direction of the male connector 101, even if some of the connections between the male connector 101 and the female connector are insufficient for a variety of reasons, for example, increased warping of the mechanical connections over time, accumulated size errors between the assembly blocks, and the like, at least two pins will almost certainly be connected. Accordingly, it is possible to prevent damage due to current being concentrated in a single pin from the outset.

The terminal group G1*s* includes the pins P6 and P10 of the male connector 101. The pin P10 is a terminal for data input and forms the serial communication wire 73. The pin P6 is a terminal for data output and forms the return wire 74.

The second terminal group G2 includes the pins P7 and P9 of the male connector 101. From the difference between the voltage signals applied to these pins P7 and P9 (a high voltage or a low voltage (ground voltage)) the orientation of the male connector 101 with respect to the female connector 102 can be known, and it is therefore possible to determine the mechanical connection orientation between the assembly blocks.

FIG. 30 shows the pad layout of the female connector 102. Out of the twenty-one pads, the pads R1 to R3 disposed in a cross along two center lines 33S that are perpendicular to each other in the concave skirt 33 are power supplying pads. The center pad R3 is a ground wire, the pads R2 on the outside thereof are power wires (VCC wires), and the pads R1 on the outside thereof are also ground wires. The pads R1 and R3 correspond to the terminal group G1*e* (the pins P1, P3, and P5) of the male connector 101 and are electrically connected. The pads R2 correspond to the terminals G1*v* of the male connector 101 (the pins P2, P4, and P8) and are electrically connected. The pads R6 and R10 disposed on both sides of the respective pads R1 correspond to the terminal group GIs (the pins P6 and P10) of the male connector 101 and by electrically connecting the pads R6 and R10, the return wire 74 and the serial loop 73 are respectively constructed.

The pads R7 and R9 disposed on both sides of each pad R2 contact the pin P7 or P9 of the second terminal group G2 of the male connector 101 depending on the connection method of the male connector 101 and the female connector 102 (i.e., the connection orientation of the convex skirt 32 and the concave skirt 33). Accordingly, by setting the pads R7 and R9 at a high voltage or low voltage (ground voltage), the information (two-bit information for detecting the orientation) obtained from the pins P7 and P9 of the second terminal group G2 will differ according to the connection orientation, which makes it possible to determine the connection orientation. Accordingly, the control apparatus 3 is capable of determining the respective connection orientations of the plurality of assembly blocks 20, reproducing the shape of the display unit 2 in a virtual three-dimensional space based on the connection orientations, and displaying the resulting shape.

One typical type of assembly block 20 is a module 21 that has a cubic housing 30 and displays one dot. One LED element 51 is provided in one cubic module. The light-emitting element is not limited to one LED element and may be a plurality of light-emitting elements that produce one emitted color through coordinated control. The cubic module may include a plurality of light-emitting elements for displaying a plurality of dots. Aside from LEDs, it is possible to use various devices such as organic EL (organic electroluminescence), inorganic EL (inorganic electroluminescence), and plasma light emitting apparatuses as the light-emitting elements.

Another typical type of assembly block 20 is the double-sized assembly block (standard block) 22 whose housing 30 is a rectangular cuboid and has a size that substantially corresponds to two of the cubes described above. The standard block 22 functions as a module that displays two dots and includes two LED elements 51 and two control units 52 for controlling the respective LED elements 51. It is also possible to include the functions as two control units in one IC. The assembly blocks 20 may have an external form where three or more cubes (unit three-dimensional shapes) are joined together. The unitary shape of the assembly blocks 20 is not limited to a cube (a regular six-sided object), and may be another polyhedron, a sphere, a tube, a cylinder, a prism, or a rectangular cylinder. Assembly blocks 20 based on a cube are one of favorable embodiments for forming a display unit 2 with no gaps.

The standard blocks 22 and the diagonal-rising blocks 23 that correspond to two-dot modules are minimum units with a multi-sized external form produced by joining two cubes and are useful when blocks are aligned or stacked together. By using multi-sized assembly blocks 20, it is possible to increase the variations in shape that can be assembled using a plurality of the assembly blocks 20. For example, in addition to the single-sized single blocks 21, by including assembly blocks 20 that correspond to two-dot modules, such as the standard block 22 and the diagonal-rising block 23, it is possible to easily assemble a display unit or the like in the form of a hollow tower.

By assembling a plurality of assembly blocks 20, it is possible to produce a panel or objet to be set up at an exhibition hall, a shop, or the like and to emit light in a desired dot pattern. Since there is no need to use screws or the like to assemble a plurality of assembly blocks 20, it is possible to easily disassemble the blocks with a manual operation, and therefore easy to change the shape or relocate the panel or objet. The display unit 2 may be constructed of only a plurality of assembly blocks 20. The display unit 2 may also be constructed by combining a base member and the assembly blocks 20 that are attached to the base member.

Each assembly block 20 has a housing 30 with a cubic external form or an external form produced by joining a plurality of cubes and an equal number of LED elements 51 as the cubes (dot modules), each LED element 51 being disposed inside the housing 30 of a cube (dot module). The input connector 61 and the output connector 62 are disposed on the upper surface or the lower surface of the housing 30. Accordingly, it is possible to combine the plurality of assembly blocks 20 by connecting the blocks with a two-level stacking of blocks as a base unit, and possible to emit light in units of the cubes across the side surface of the assembly blocks 20 in the stacked state. Accordingly, by using the plurality of assembly blocks 20, it is possible to emit light across a substantially continuous surface that has the exposed side surfaces of the display unit 2 as a principle surface but also includes the upper surface, the bottom surface, and the like.

Also, the standard block 22 and the diagonal-rising block 23 include the internal wall portion 56 that separates the insides of the housing 30 into dot units. Accordingly, in the multi-sized, multi-dot assembly blocks 20, it is possible to maintain the independence of the emitted color of each dot and to suppress the mixing of colors (crosstalk). For example, dots that light up dimly can be prevented from becoming bright due to light from another dot in the same assembly block.

By electrically connecting the input connector 61 and the output connector 62, power from an external power supply included in the display control apparatus 3 is supplied to a plurality of assembly blocks 20. Accordingly, it is not necessary to provide a battery in each assembly block 20. A battery should be a light shielding member, and by not including a battery in each assembly block 20, the assembly blocks 20 has wider translucent surfaces. Typically, it is possible to emit light on all sides (six sides) of the assembly blocks 20 and to use all of the side surfaces of the display unit 2 as a substantially continuous image display surface.

A typical assembly block 20 includes one input connector 61 and one output connector 62. The assembly blocks 20 may include a type of assembly block 20 that includes a plurality of input connectors 61 and a plurality of output connectors 62. The assembly blocks 20 may also include a type of assembly block 20 that is equipped with two or more of at least one of the input connectors 61 and the output connectors 62.

In the above description, the combination of the convex skirt 32 and the concave skirt 33 that can be mechanically connected by insertion is used as the mechanical interface of the assembly blocks 20. The mechanical interface may be a magnetic coupling or connection, for example, and it is possible to connect the housings with the surfaces in contact but without the housings overlapping.

The control units 52 included in the assembly blocks 20 are connected by the serial communication circuit 73 and the serial communication circuit 73 is connected to the return circuit 74 at the end block 25, thereby producing an overall loop-shaped connection circuit. If the serial communication circuit 73 and the return circuit 74 are single communication wires, commands and data are transferred by the single-phase signals (high/low (1,0). It is also possible to construct the serial communication circuit 73 and the return circuit 74 of multiple wires, which makes it possible to further improve the reliability of communication by transferring the commands and data using two-phase signals. In addition, the electrical connection between an assembly block 20 and another assembly block 20 to which the assembly block 20 is mechanically connected may be realized by an optical interface or a wireless communication interface, and a function that distinguishes the connection orientation of another assembly block 20 may be included in such interfaces.

Although a number of embodiments of the present invention have been described above, the present invention is not limited to such and may be subjected to various modifications and changes without departing from the scope of the invention.

The invention claimed is:

1. An assembly block comprising:

a first light-emitting element;

a first control unit including a function that controls light outputted from the first light-emitting element; and a housing that holds at least the first light-emitting element and the first control unit and includes mechanical interfaces that are provided on a first side and a second side for mechanically connecting the housing to external connectors, wherein at least part of the housing is translucent, wherein the first control unit includes:

a first functional unit that stores, when a first data set that includes data for controlling color of light outputted from the first light-emitting element and a first command that includes a designation of transfer of the first data set are received via a first electrical interface associated with the mechanical interface on the first side of the housing, the first data set received in a buffer and outputs the stored first data set stored in the buffer and the first command via a second electrical interface associated with the mechanical interface on the second side; and a second functional unit that sets, when a second command that includes a designation of latching is received via the first electrical interface, the stored first data set as a next data set for controlling the first light-emitting element by the control unit and outputs the second command via the second electrical interface.

2. The assembly block according to claim 1, wherein the first control unit further includes a third functional unit that controls, when a third command that includes a designation of switching of illumination control of the first light-emitting element is received via the first electrical interface, the first light-emitting element so as to produce an illumination state based on the next data set and outputs the third command via the second electrical interface.

3. The assembly block according to claim 1, wherein the first control unit further includes a fourth functional unit that outputs, when a fourth command including a designation of transfer of a second data set including information showing a connection relationship of the mechanical interface on the first side and/or the second side has been received via the first electrical interface, via the second electrical interface, the fourth command and at least one second data set received via the first electrical interface following the fourth command and outputs, via the second electrical interface, the second data set of the assembly block itself following the received at least one second data set.

4. The assembly block according to claim 3, further comprising a signal line that directly outputs data received via the second electrical interface via the first electrical interface.

5. The assembly block according to claim 1, wherein the first-side and second-side mechanical interfaces are mechanical connection units that are respectively capable of connecting to the mechanical connection units of housings of other assembly blocks, and connection orientations by the mechanical connection units of the housings of the other assembly blocks and the housing of present assembly block are changeable.

6. The assembly block according to claim 5, wherein the mechanical connection units are connection units for connecting in a direction freely chosen out of at least two orientations.

7. The assembly block according to claim 5, further comprising electrical connection units that become electrically connected to electrical connection units of the other assembly blocks respectively when the mechanical connection units are connected to the mechanical connection units of the other assembly blocks respectively, wherein when the mechanical connection units are connected together, the first electrical interface and/or the second electrical interface become electrically connected to at least one of the control units included in the other assembly blocks via the electrical connection units.

8. The assembly block according to claim 7, wherein the mechanical connection units are provided on the housings respectively so as to mechanically connect with a part of the housing of other assembly block and a part of the housing of the present assembly block in an overlapping state, and the electrical connection units are provided on the housings respectively so as to electrically connect to electrical connection units of the other assembly block connected in the overlapping state.

9. The assembly block according to claim 1, further comprising a second light-emitting element, and a second control unit for the second light-emitting element, wherein a first electrical interface of the second control unit is associated with the mechanical interface on the first side via the first control unit and the second electrical interface of the first control unit is associated with the mechanical interface on the second side via the second control unit.

10. The assembly block according to claim 1, wherein the housing has an external form composed of one of 3D shape units or a plurality of the 3D shape units joined together, the 3D shape units including one of predetermined three-dimensional shapes that are capable of being aligned or stacked with each other.

11. The assembly block according to claim 10, wherein the housing has an external form composed of the plurality of the 3D shape units joined together, and wherein the mechanical interface on the first side is provided on one of the plurality of the 3D shape units joined together and the mechanical interface on the second side is provided on the other of the plurality of the 3D shape units joined together.

12. The assembly block according to claim 11, wherein the housing includes parts of a first 3D shape unit and a second 3D shape unit, the first light emitting element is disposed in the first 3D shape unit; and further comprising a second light-emitting element disposed in the second 3D shape unit, and a second control unit for the second light-emitting element, wherein the first electrical interface of the second control unit is associated with the mechanical interface on the first side via the first control unit and the second electrical interface of the first control unit is associated with the mechanical interface on the second side via the second control unit.

13. The assembly block according to claim 12, wherein the housing includes at least one internal wall portion disposed between the first 3D shape unit and the second 3D shape unit.

14. The assembly block according to claim 12, wherein the mechanical interface on the first side is provided on the first 3D shape unit and the mechanical interface on the second side is provided on the second 3D shape unit.

15. The assembly block according to claim 14, wherein the mechanical interface on the first side and the mechanical interface on the second side are respectively provided on an upper surface or a lower surface of respective 3D shape units.

16. The assembly block according to claim 1, wherein the mechanical interfaces are mechanical connection units that are respectively capable of connecting to the mechanical connection units of housings of other assembly blocks, wherein connection orientations of the housings of the other assembly blocks and the housing of present assembly block are variable, the assembly block further comprises electrical connection units that become electrically connected to electrical connection units of the other assembly blocks respectively when the mechanical connection units are connected to the mechanical connection units of the other assembly blocks, the first electrical interface and/or the second electrical interface become electrically connected to at least one of the control units included in the other assembly blocks via the electrical connection units, each of the electrical connection units includes: a first terminal group disposed so that an electrical connection relationship does not change according to a connection orientation of the mechanical connection units; and a second terminal group disposed so that an electrical connection relationship changes according to the connection orientation of the mechanical connection units, and the control unit includes a functional unit that generates a second data set including information showing the connection orientation based on the electrical connection relationship of the second terminal group.

17. The assembly block according to claim 16, wherein the second terminal group of one of electrical connection units includes a plurality of standard terminals provide different potentials, and the second terminal group of another electrical connection units includes a plurality of identification terminals whose connections with the plurality of the standard terminals change according to the connection orientation.

18. The assembly block according to claim 16, wherein the first terminal group includes a communication terminal and a power supplying terminal for supplying power to cause the light-emitting terminal to emit light.

19. The assembly block according to claim 18, wherein the first terminal group and the second terminal group are disposed so as to connect in a region having a longitudinal shape, the first terminal group includes a combination of a plurality of power supplying terminals, and the plurality of power supplying terminals are disposed so as to be spread out along the longitudinal shape.

20. A display system including a display unit comprising a plurality of assembly blocks according to claim 1, wherein the display unit includes at least one light-emitting group including a plurality of assembly blocks that are connected by the mechanical interfaces and the plurality of assembly blocks are also electrically connected by the first electrical interface and the second electrical interface, and the display system further comprises a control apparatus including a functional unit of transmitting that transmits the first data sets, the first command, and the second command to an assembly block that constructs one end of the at least one light-emitting group.

21. The display system according to claim 20, wherein each assembly block includes electrical connection units that become electrically connected to electrical connection units of other assembly blocks respectively when the mechanical interfaces are connected to the mechanical interfaces of the other assembly blocks respectively, and the first electrical interface and/or the second electrical interface become electrically connected to at least one of the control units included in the other assembly blocks via the electrical connection units.

22. The display system according to claim 21, wherein the control unit is capable of acquiring information showing a connection relationship with the other assembly blocks based on connections of the electrical connection units, the control apparatus includes:

a functional unit of acquiring that acquires the information showing the connection relationships from the at least one light-emitting group; and a functional unit of generating that analyzes information showing the connection relationships and generates connection replication data showing a connection state of the plurality of assembly blocks included in the at least one light-emitting group, and wherein based on the connection replication data, the functional unit of transmitting transmits the first data sets that respectively correspond to the assembly blocks included in the at least one light-emitting group to the at least one light-emitting group.

23. The display system according to claim 22, wherein the information showing the connection relationship includes information of types of respective assembly blocks and information showing a connection orientation between the respective assembly blocks and other assembly blocks that contact the respective assembly blocks.

24. The display system according to claim 22, wherein the functional unit of acquiring causes the functional unit of transmitting to transmit a fourth command, which includes a request for second data sets including information showing the connection relationships, to the at least one light-emitting group, and then receives respective second data sets of the assembly blocks included in the at least one light-emitting group following the fourth command and in accordance with an order of the assembly blocks included in the at least one light-emitting group, and the functional unit of generating generates the connection replication data in accordance with the order in which the second data sets were received.

25. The display system according to claim 22, wherein the functional unit of transmitting reorders a plurality of first data sets for displaying on the display unit based on the connection replication data and transmits reordered first data sets to the at least one light-emitting group.

26. A control apparatus of a display unit comprising a plurality of assembly blocks according to claim 1, wherein the display unit includes at least one light-emitting group constructed so as to include a plurality of assembly blocks connected by the mechanical interfaces, and the plurality of assembly blocks are also electrically connected by the first electrical interface and the second electrical interface, each assembly block includes electrical connection units that become electrically connected to electrical connection units of other assembly blocks respectively when the mechanical interfaces are connected to the mechanical interfaces of the other assembly blocks respectively, the first electrical interface and/or the second electrical interface becoming electrically connected to at least one of the control units included in the other assembly blocks via the electrical connection units, the control unit is capable of acquiring information showing a connection relationship with respect to the other assembly blocks based on connections of the electrical connection units, the control apparatus comprising:

a functional unit of transmitting that transmits the first data sets, the first command, and the second command to an assembly block that constructs one end of the at least one light-emitting group;

a functional unit of acquiring that acquires the information showing the connection relationships from the at least one light-emitting group; and a functional unit of generating that analyzes information showing the connection relationships and generates connection replication data showing a connection state of the plurality of assembly blocks included in the at least one light-emitting group, wherein based on the connection replication data, the functional unit of transmitting transmits the first data sets that respectively correspond to the assembly blocks included in the at least one light-emitting group to the at least one light-emitting group.

27. A display unit comprising a plurality of assembly blocks according to claim 1.

28. A method of controlling a display unit including a plurality of assembly blocks according to claim 1, wherein the display unit includes at least one light-emitting group constructed so as to include a plurality of assembly blocks connected by the mechanical interfaces, and the plurality of assembly blocks are also electrically connected by the first electrical interface and the second electrical interface, the method comprising transmitting the first data sets, the first command, and the second command to an assembly block that constructs one end of the at least one light-emitting group.

29. The method according to claim 28, wherein each assembly block includes electrical connection units that become electrically connected to electrical connection units of other assembly block respectively when the mechanical interfaces are connected to the mechanical interfaces of the other assembly blocks respectively, the first electrical interface and/or the second electrical interface becoming electrically connected to at least one of the control units included in the other assembly blocks via the electrical connection units, the control unit being capable of acquiring information showing the connection relationship with respect to the other assembly blocks based on connections of the electrical connection units, the method further comprising:

acquiring the information showing the connection relationships from the at least one light-emitting group; and generating that includes analyzing the information showing the connection relationships and generating connection replication data showing a connection state of the plurality of assembly blocks included in the at least one light-emitting group, wherein the transmitting includes a step of transmitting, based on the connection replication data, the first data sets that respectively correspond to the assembly blocks included in the at least one light-emitting group to the at least one light-emitting group.

30. The method according to claim 29, wherein the acquiring includes a step of transmitting a fourth command that includes a request for second data sets including information showing the connection relationships, to the at least one light-emitting group, and a step of receiving respective second data sets of the assembly blocks included in the at least one light-emitting group following the fourth command in accordance with an order of the assembly blocks included in the at least one light-emitting group, and the generating generates the connection replication data in accordance with the order in which the second data sets received.

31. The method according to claim 29, wherein the transmitting includes reordering the plurality of first data sets for displaying on the display unit in accordance with the connection replication data and transmitting reordered first data sets to the at least one light-emitting group.

32. A nontransitory computer readable medium encoded with a program for causing a computer to function as a control apparatus of a display unit including a plurality of assembly blocks according to claim 1, wherein the display unit includes at least one light-emitting group constructed so as to include a plurality of assembly blocks connected by the mechanical interfaces, and the plurality of assembly blocks are also electrically connected by the first electrical interface and the second electrical interface, the control apparatus comprising a function of transmitting that transmits the first data sets, the first command, and the second command to an assembly block that constructs one end of the at least one light-emitting group.

33. The program according to claim 32, wherein each assembly block includes electrical connection units that become electrically connected to electrical connection units of other assembly blocks respectively when the mechanical interfaces are connected to the mechanical interfaces of the other assembly blocks respectively, the first electrical interface and/or the second electrical interface become electrically connected to at least one of the control units included in the other assembly blocks via the electrical connection units, the control unit being capable of acquiring information showing a connection relationship with respect to the other assembly blocks based on connections of the electrical connection units, the control apparatus further comprising:

a function of acquiring that acquires the information showing the connection relationships from the at least one light-emitting group; and a function of generating that analyzes information showing the connection relationships and generates connection replication data showing a connection state of the plurality of assembly blocks, wherein the function of transmitting transmits, based on the connection replication data, the first data sets that respectively correspond to the assembly blocks included in the at least one light-emitting group to the at least one light-emitting group.

34. The program according to claim 33, wherein the function of acquiring causes the function of transmitting to transmit a fourth command, which includes a request for second data sets including information showing the connection relationships, to the at least one light-emitting group, and then receives respective second data sets of the assembly blocks included in the at least one light-emitting group following the fourth command and in accordance with an order of the assembly blocks included in the at least one light-emitting group, the function of generating generates the connection replication data in accordance with the order in which the second data sets were received, and the function of transmitting reorders the first data sets for displaying on the display unit based on the connection replication data and transmits reordered first data sets to the at least one light-emitting group.

* * * * *